United States Patent
Palekar et al.

(10) Patent No.: US 9,348,627 B1
(45) Date of Patent: May 24, 2016

(54) DISTRIBUTED DYNAMIC FEDERATION BETWEEN MULTI-CONNECTED VIRTUAL PLATFORM CLUSTERS

(71) Applicants: Ashish A. Palekar, Franklin, MA (US);
Dale Hagglund, Edmonton (CA);
Bradford B. Glade, Harvard, MA (US)

(72) Inventors: Ashish A. Palekar, Franklin, MA (US);
Dale Hagglund, Edmonton (CA);
Bradford B. Glade, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 598 days.

(21) Appl. No.: 13/721,502

(22) Filed: Dec. 20, 2012

(51) Int. Cl.
*G06F 9/54* (2006.01)
*G06F 9/455* (2006.01)

(52) U.S. Cl.
CPC .................................. *G06F 9/45533* (2013.01)

(58) Field of Classification Search
CPC ................................................... G06F 9/45533
See application file for complete search history.

(56) References Cited

U.S. PATENT DOCUMENTS

| | | | |
|---|---|---|---|
| 7,054,883 B2 | 5/2006 | Meiri et al. | |
| 7,266,706 B2 | 9/2007 | Brown et al. | |
| 7,475,207 B2 | 1/2009 | Bromling et al. | |
| 7,577,722 B1 | 8/2009 | Khandekar et al. | |
| 7,613,890 B1 | 11/2009 | Meiri | |
| 7,949,637 B1 | 5/2011 | Burke | |
| 2005/0160133 A1* | 7/2005 | Greenlee | G06F 9/505 709/200 |
| 2006/0031450 A1 | 2/2006 | Unrau et al. | |
| 2011/0283017 A1* | 11/2011 | Alkhatib et al. | 709/244 |
| 2014/0047201 A1* | 2/2014 | Mehta | 711/158 |

OTHER PUBLICATIONS

U.S. Appl. No. 13/537,839, filed Jun. 29, 2012, Palekar et al.
U.S. Appl. No. 13/433,885, filed Mar. 29, 2012, Salamon et al.
U.S. Appl. No. 13/136,359, filed Jul. 29, 2011, Van Der Goot.
U.S. Appl. No. 12/932,080, filed Feb. 17, 2011, Meiri et al.
U.S. Appl. No. 12/930,121, filed Dec. 29, 2010, Ortenberg et al.
U.S. Appl. No. 12/080,027, filed Mar. 31, 2008, Meiri et al.
EMC Corporation, "EMC Unified Infrastructure Manager/Operations: Centralized visibility across multiple VCE Vblock Infrastructure Platforms and Their Availability," Data Sheet h8713.3, Apr. 2012, 2 pp.
EMC Corporation, "Using VMware Vsphere with EMC VPLEX," White paper h7118.2, Jul. 2011, 80 pp.
EMC Corporation, "Array-based Replication with EMC VPLEX," White paper h8005, Aug. 2010, 19 pp.
EMC Corporation, Cisco Systems, Inc., VMware, Inc., "Virtual Computing Environment Coalition—Vblock Infrastructure Packages," Brochure h6703, Oct. 2009, 3 pp.

* cited by examiner

*Primary Examiner* — Syed Roni
(74) *Attorney, Agent, or Firm* — Muirhead and Saturnelli, LLC

(57) ABSTRACT

Dynamic mobility of virtual data centers and converged infrastructure components, such as Vblocks, may be provided using a virtual platform product that federates and/or coordinates virtual storage. The system described herein enables sharing of distributed resources between multi-connected virtual platform clusters, such as VPLEX clusters, in a dynamic sharing arrangement. A virtual platform cluster may include one or more pairs of directors that enables failover from one director of the pair(s) to the other director of the pair(s) in a cluster in the case of hardware or path failure.

23 Claims, 18 Drawing Sheets

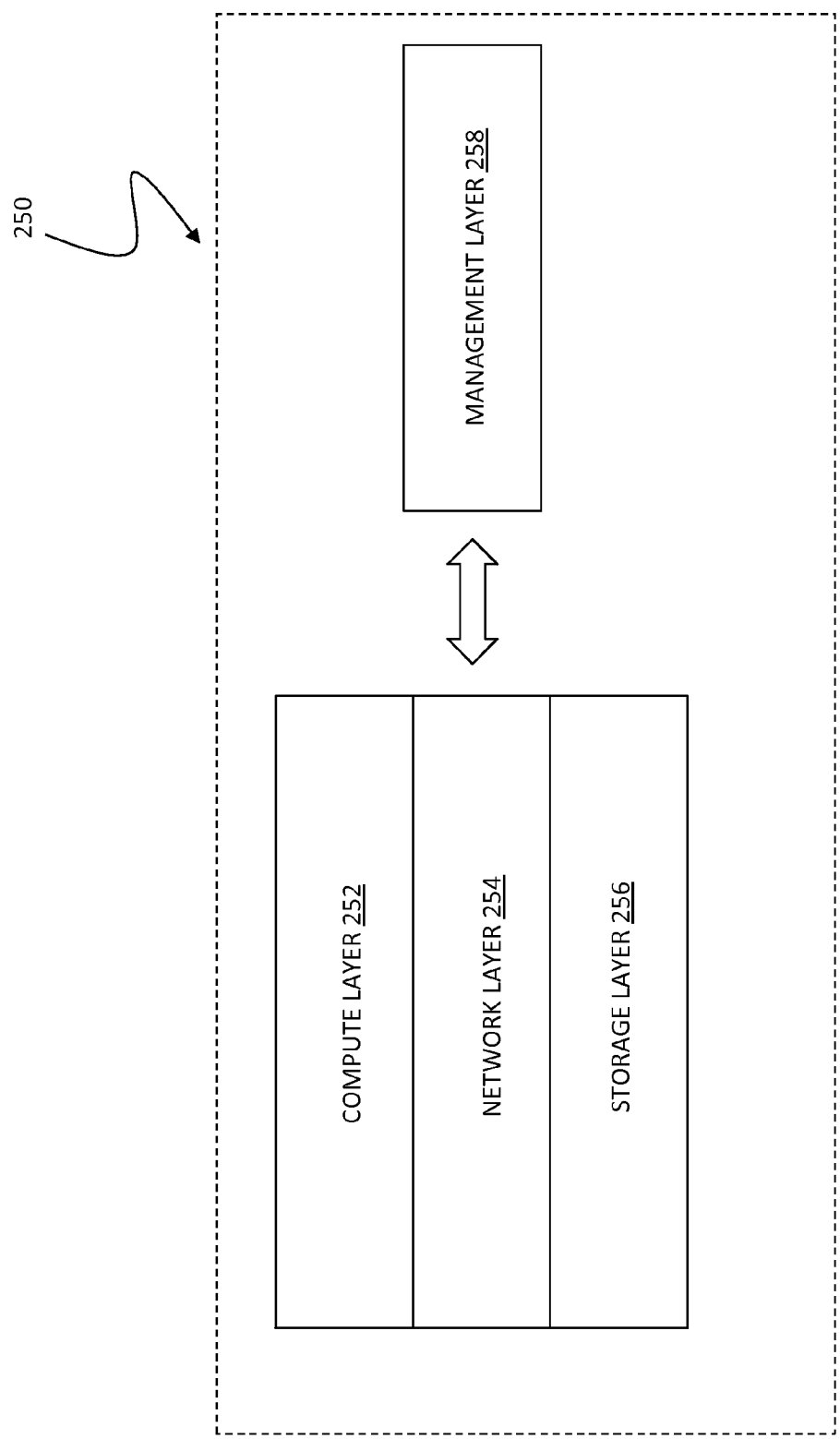

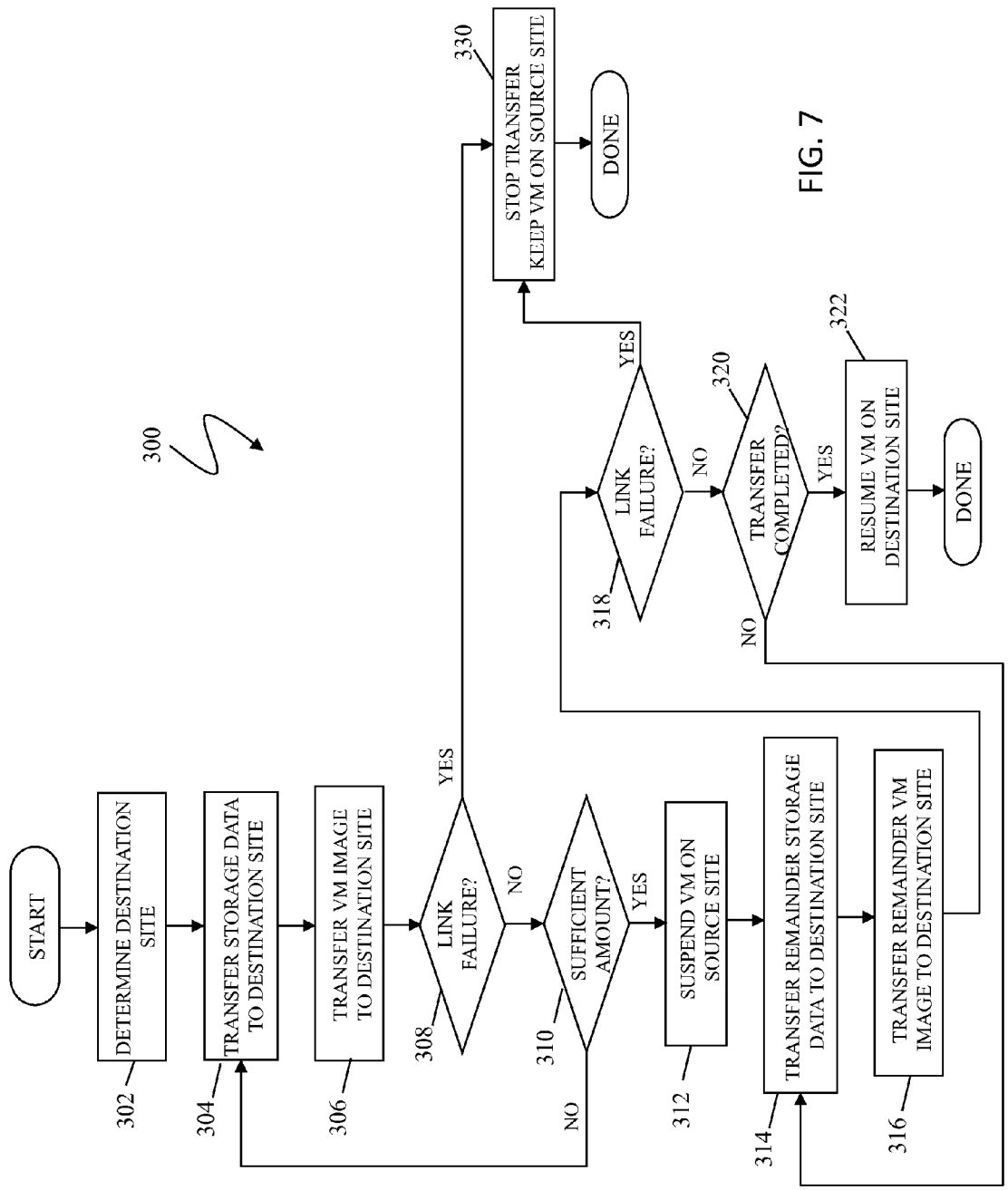

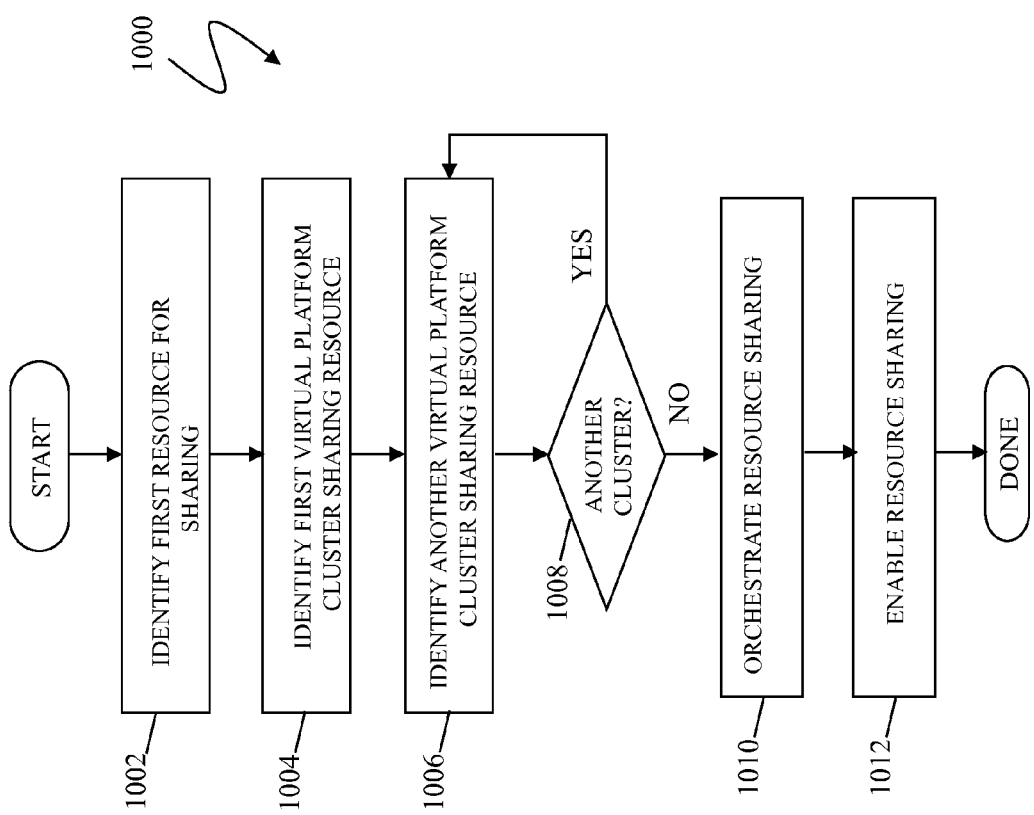

DISTRIBUTED DYNAMIC FEDERATION BETWEEN MULTI-CONNECTED VIRTUAL PLATFORM CLUSTERS

TECHNICAL FIELD

This application is related to the field of data storage and, more particularly, to systems for managing data and resources in a virtualized environment.

BACKGROUND OF THE INVENTION

In current storage networks, and particularly storage networks including geographically distributed directors (or nodes) and storage resources, preserving or reducing bandwidth between resources and directors while providing optimized data availability and access is highly desirable. Data access may be localized, in part, to improve access speed to pages requested by host devices. Caching pages at directors provides localization, however, it is desirable that the cached data be kept coherent with respect to modifications at other directors that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Particularly for asynchronous transfers, it is desirable to maintain a proper ordering of writes such that any errors or failures that occur during data transfer may be properly identified and addressed such that, for example, incomplete data writes be reversed or rolled back to a consistent data state as necessary.

Reference is made, for example, to U.S. Pat. No. 7,475,207 to Bromling et al. entitled "Maintaining Write Order Fidelity on a Multi-Writer System," which is incorporated herein by reference, that discusses features for maintaining write order fidelity (WOF) in an active/active system in which a plurality of directors (i.e. controllers and/or access nodes) at geographically separate sites can concurrently read and/or write data in a distributed data system. Discussions of data ordering techniques for synchronous and asynchronous data replication processing for other types of systems, including types of remote data facility (RDF) systems produced by EMC Corporation of Hopkinton, Mass., may be found, for example, in U.S. Pat. No. 7,613,890 to Meiri, entitled "Consistent Replication Across Multiple Storage Devices," U.S. Pat. No. 7,054,883 to Meiri et al., entitled "Virtual Ordered Writes for Multiple Storage Devices," and U.S. patent application Ser. No. 12/080,027 to Meiri et al., filed Mar. 31, 2008, entitled "Active/Active Remote Synchronous Mirroring," which are all incorporated herein by reference.

In a virtualized environment, a centralized management infrastructure, henceforth referred to as a virtual center, may provide a central point of control for managing, monitoring, provisioning and migrating virtual machines. A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources. Under various circumstances, it may be advantageous to control access to resources among the virtual components, including sharing of distributed resources among the virtual components.

A distributed storage system of a virtualized environment may include a grid, and/or other configuration, of different storage nodes connected to each other over synchronous and/or asynchronous latencies. Coordinating and controlling the sharing of resources distributed among these different storage nodes may, in many cases, be difficult or problematic using known technologies.

Accordingly, it is desirable to provide an effective and efficient system to address issues like that noted above for a distributed system in a virtualized environment.

SUMMARY OF THE INVENTION

According to the system described herein, a method of sharing resources in a virtualized environment includes providing access by a plurality of virtual platform clusters to distributed resources of the virtualized environment. Sharing of the distributed resources among the plurality of virtual platform clusters is dynamically managed according to a sharing arrangement. The distributed resources include a plurality of objects, and a first subset of the plurality of objects is shared among the plurality of virtual platform clusters differently than a second subset of the plurality of objects. The distributed resources may be provided on at least one converged infrastructure, that may include a plurality of converged infrastructures that are remotely located from each other. The distributed resources may be available from the plurality of virtual platform clusters in connection with operation under different latencies or operating conditions, the different latencies or operating conditions including at least one of: a synchronous latency, an asynchronous latency, an active operating condition or a passive operating condition. A composed relationship of at least one of the subsets of the plurality of objects shared among the plurality of virtual platform clusters may include multiple legs having combinations of the different latencies or operating conditions, the combinations including synchronous latency/active operating condition, synchronous latency/passive operating condition, asynchronous latency/active operating condition, and/or asynchronous latency/passive operating condition. The sharing arrangement may be changed over time according to changing access requirements of the plurality of virtual platform clusters to the distributed resources. Each of the first subset and the second subset of objects shared among the plurality of virtual platform clusters may include fewer than all of the plurality of objects. The plurality of virtual platform clusters may include at least three virtual platform clusters. The method may further include providing a management component distributed across the plurality of virtual platform clusters. The distributed resources may include storage, compute and/or network resources.

According further to the system described herein, a non-transitory computer readable medium stores software for sharing resources in a virtualized environment. The software includes executable code that provides access by a plurality of virtual platform clusters to distributed resources of the virtualized environment. Executable code is provided that dynamically manages sharing of the distributed resources among the plurality of virtual platform clusters according to a sharing arrangement. The distributed resources include a plurality of objects. A first subset of the plurality of objects is shared among the plurality of virtual platform clusters differently than a second subset of the plurality of objects. The distributed resources may be provided on at least one converged infrastructure, that may include a plurality of converged infrastructures that are remotely located from each other. The distributed resources may be available from the plurality of virtual platform clusters in connection with operation under different latencies or operating conditions, the different latencies or operating conditions including at least one of: a synchronous latency, an asynchronous latency, an active operating condition or a passive operating condition. A composed relationship of at least one of the subsets of the plurality of objects shared among the plurality of virtual platform clusters may include multiple legs having combinations of the different latencies or operating conditions, the combinations including synchronous latency/active operating condition, synchronous latency/passive operating condition, asynchronous latency/active operating condition, and/or asynchronous latency/passive operating condition. The sharing arrangement may be changed over time according to changing access requirements of the plurality of virtual platform clusters to the distributed resources. each of the first subset and the second subset of objects shared among the plurality of virtual platform clusters may include fewer than all of the plurality of objects. The plurality of virtual platform clusters may include at least three virtual platform clusters. Executable code may be provided that provides a management component distributed across the plurality of virtual platform clusters. The distributed resources may include storage, compute and/or network resources.

According further to the system described herein, a system of a virtualized environment includes a plurality of virtual platform clusters and at least one converged infrastructure. A non-transitory computer readable medium is provided storing software for sharing resources in the virtualized environment. The software includes executable code that provides access by the plurality of virtual platform clusters to distributed resources of the at least one converged infrastructure. Executable code is provided that dynamically manages sharing of the distributed resources among the plurality of virtual platform clusters according to a sharing arrangement. The distributed resources include a plurality of objects. A first subset of the plurality of objects is shared among the plurality of virtual platform clusters differently than a second subset of the plurality of objects. The distributed resources may be provided on a plurality of converged infrastructures that are remotely located from each other. The distributed resources may be available from the plurality of virtual platform clusters in connection with operation under different latencies or operating conditions, the different latencies or operating conditions including at least one of: a synchronous latency, an asynchronous latency, an active operating condition or a passive operating condition. A composed relationship of at least one of the subsets of the plurality of objects shared among the plurality of virtual platform clusters may include multiple legs having combinations of the different latencies or operating conditions, the combinations including synchronous latency/active operating condition, synchronous latency/passive operating condition, asynchronous latency/active operating condition, and/or asynchronous latency/passive operating condition. The sharing arrangement may be changed over time according to changing access requirements of the plurality of virtual platform clusters to the distributed resources. Executable code may be provided that provides a management component distributed across the plurality of virtual platform clusters.

BRIEF DESCRIPTION OF THE DRAWINGS

Embodiments of the system described herein are explained with reference to the several figures of the drawings, which are briefly described as follows.

FIG. 6 shows an exemplary cloud computing system that may be used in connection with various embodiments of the system described herein in a manner similar to that discussed herein in connection with other types of distributed processing systems.

FIG. 7 is a flow diagram showing a method for providing mobility of a virtual machine between a first site and a second site of an active/active system according to an embodiment of the system described herein.

FIG. 17 is a flow diagram showing processing for sharing resource objects among multiple virtual platform clusters for one or more converged infrastructure products according to an embodiment of the system described herein.

DETAILED DESCRIPTION OF VARIOUS EMBODIMENTS

Figure 1:
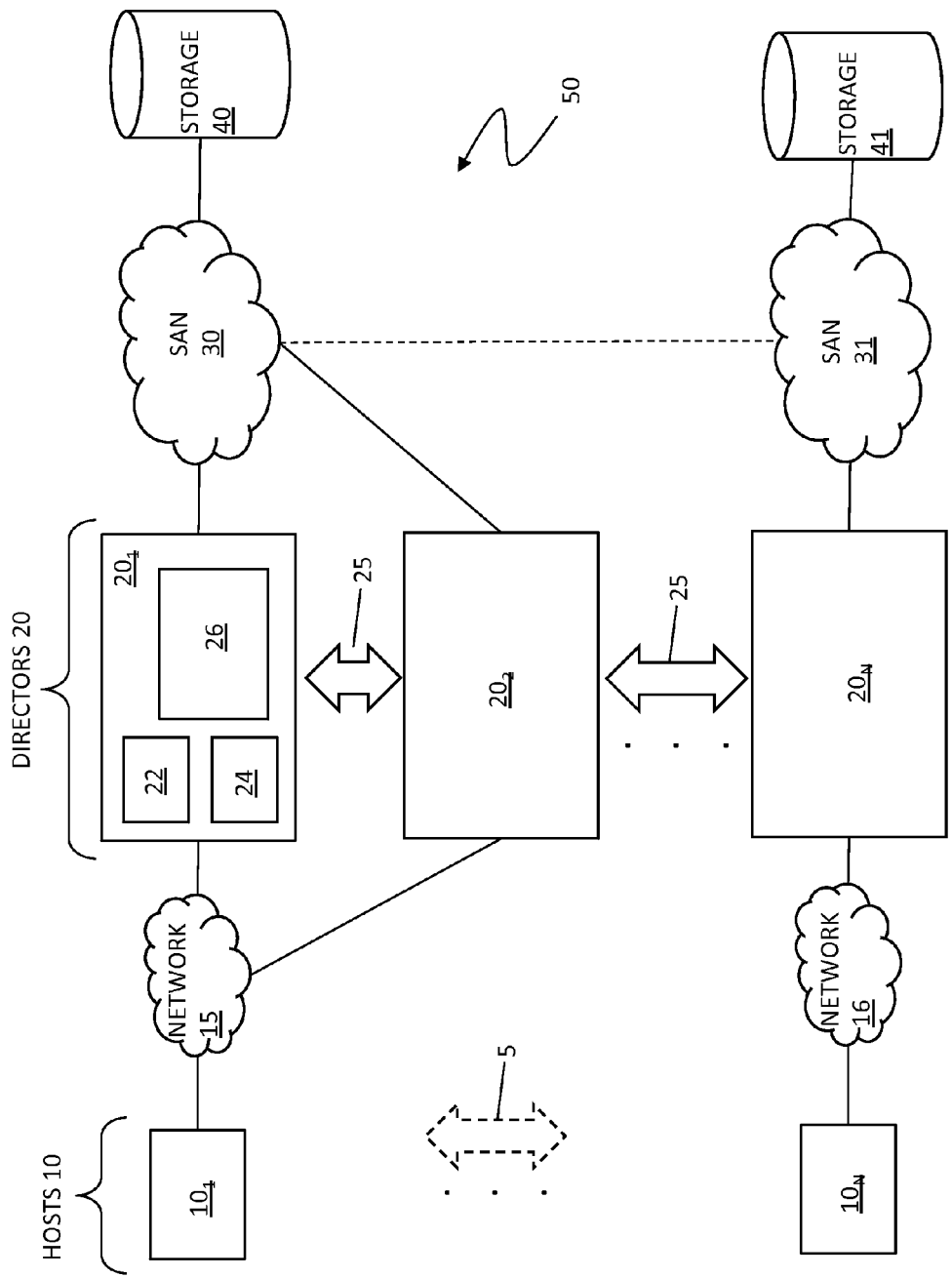
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with the SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a vSphere and/or VPLEX product produced by VMware Inc. of Palo Alto, Calif. and EMC Corporation of Hopkinton, Mass., respectively. The system described herein may also be used in connection with an storage product produced by EMC Corporation, such as a Symmetrix product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center, an example of which may be a vCenter product produced by VMware, may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
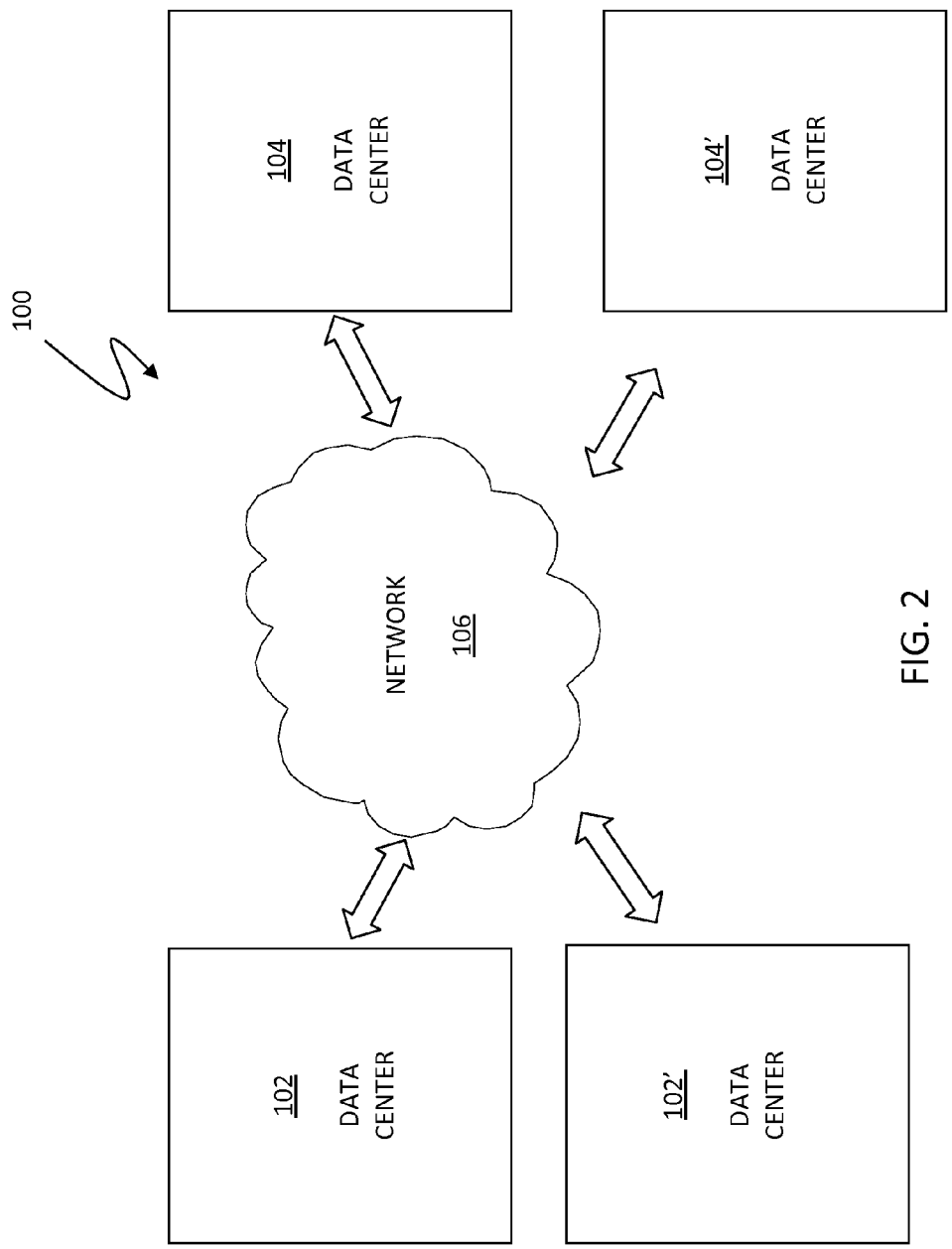
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
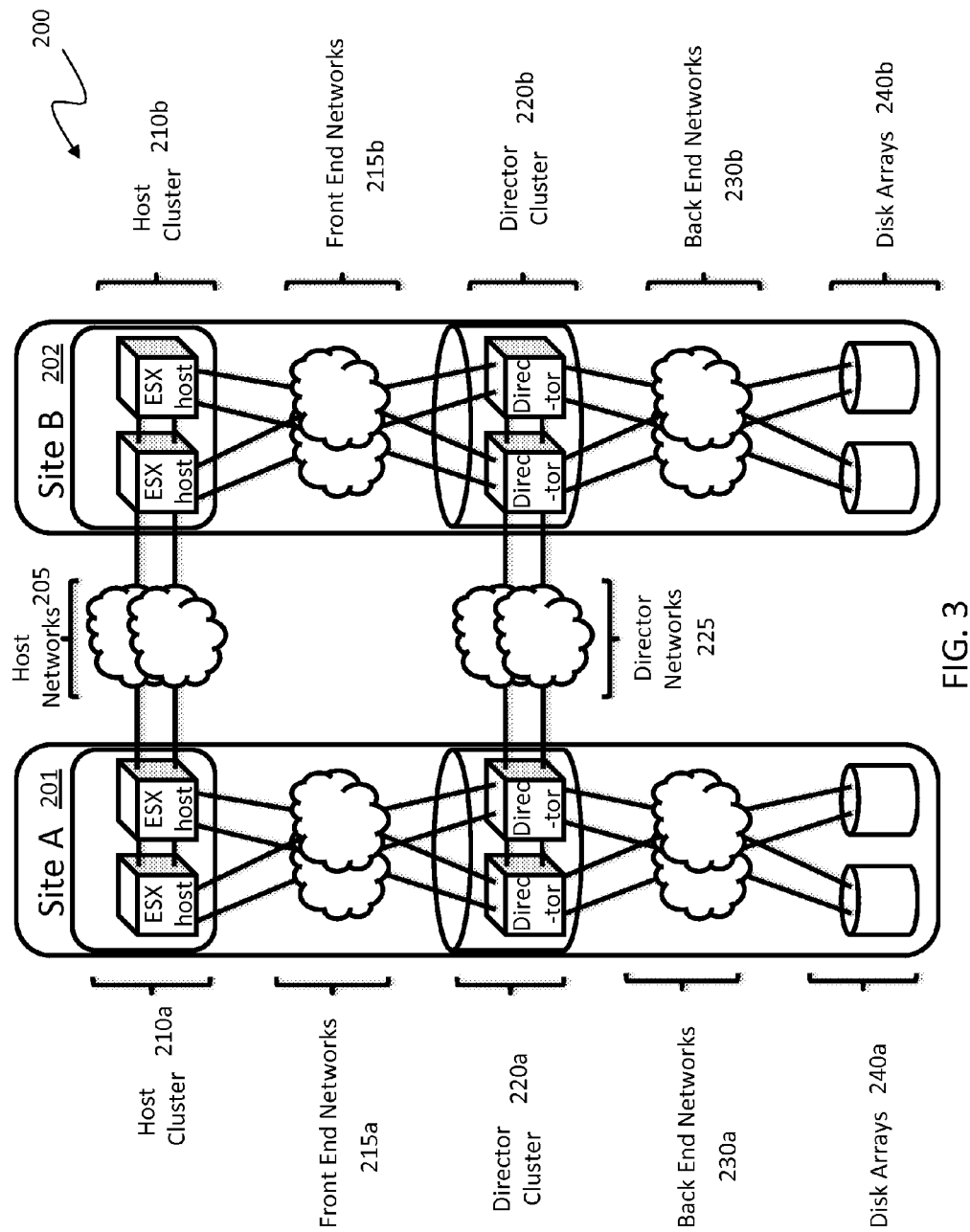
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform I/O operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. As noted elsewhere herein, known techniques may provide write order consistency by grouping writes in what are called deltas and providing the consistency on a delta boundary basis (see, e.g. U.S. Pat. No. 7,475,207 to Bromling et al.).

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van Der Goot, as cited elsewhere herein.

Figure 4:
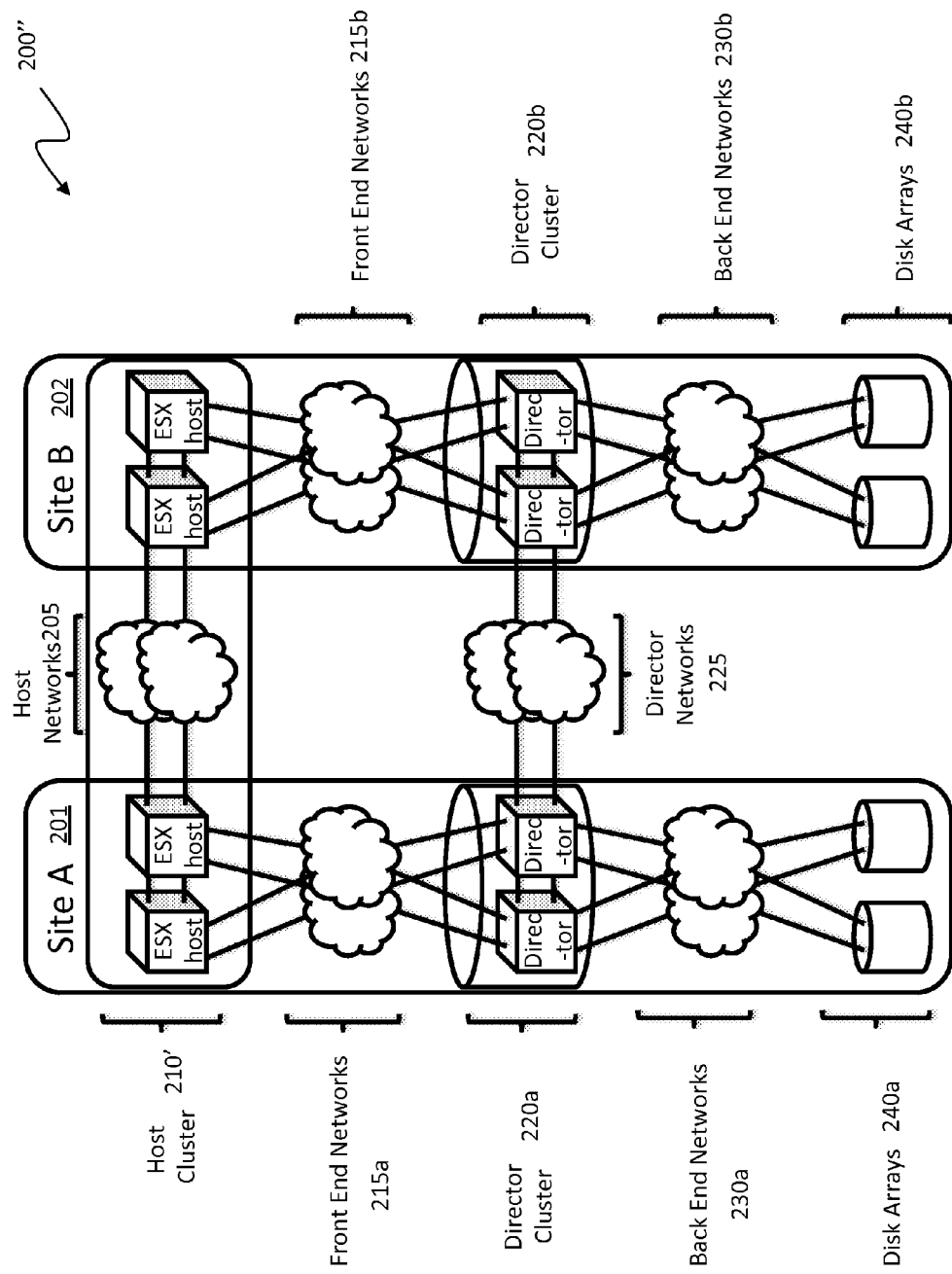
FIGS. 4 and 5 show alternative configurations of distributed storage systems that may be used in accordance with embodiments of the system described herein.
Figure 5:
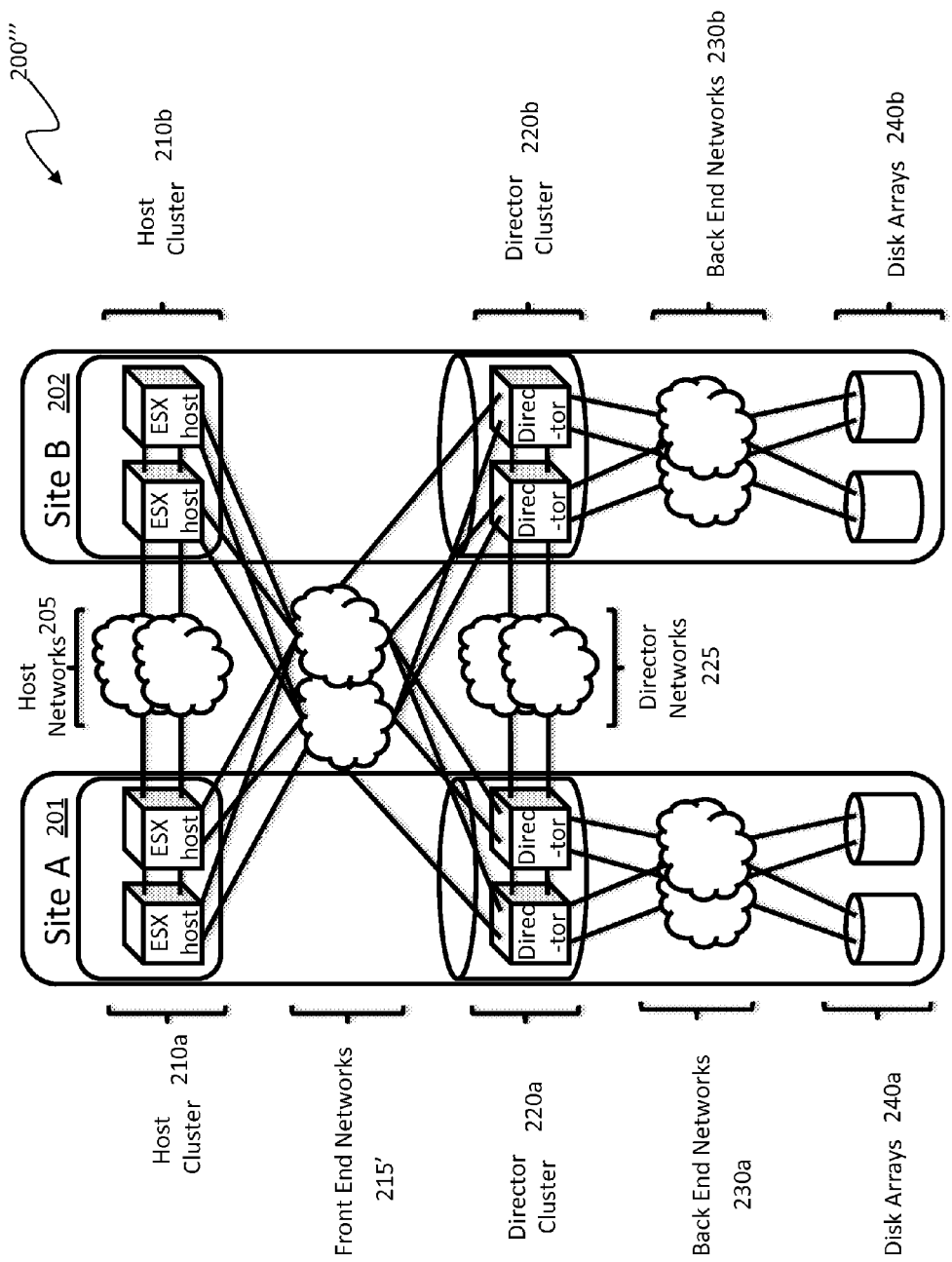

FIGS. 4 and 5 show alternative configurations for distributed storage systems that may be used in accordance with embodiments of the system described herein. In FIG. 4, a distributed storage system 200" is shown that includes a host cluster 210' as a distributed processing layer operating across the multiple sites 201, 202 and otherwise having elements like that discussed elsewhere herein. In FIG. 5, a distributed storage system 200''' is shown in which the front end networks 215' are shown operating as an external network accessed by each of the sites 201, 202 and otherwise having elements like that discussed elsewhere herein.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. In various embodiments, the system described herein may provide for dynamic federation of distributed resources that may include storage, compute and/or network resources. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM), as further discussed elsewhere herein.

In connection with the distributed processing systems discussed above, it is noted that, according to various embodiment, once a director cluster (e.g., VPLEX) has a vulnerability where one additional failure (or a limited number of additional failures) would result in Data Unavailability (DU) in a site according to the system described herein, it may start taking proactive measures to prevent this DU event from happening. In other words, the system may transition towards an active/passive model. This may involve determining which site is a less vulnerable or otherwise preferred site in the event of the failure. Thereafter, the system may migrate all VMs to the less vulnerable (preferred) site (away from the more vulnerable site). If both sites are vulnerable to the same degree, the VMs are migrated to the customer's indicated preferred site. The director cluster (VPLEX) may initiate these migrations by specifying a "must" preference through an interface to a vCenter. According to various embodiments, a must preference from VPLEX to vSphere indicates on what ESX hosts VMs must be running in order to have and retain access to a specific virtual volume. A must preference from vSphere to VPLEX indicates on what directors a virtual volume must survive in order for VMs to have and retain access to it. Contrast this to a "should" preference for where the winning clusters contains the same volume image as the losing or stopped cluster. A should preference from VPLEX to vSphere indicates on what ESX hosts VMs may ideally be. A should preference from vSphere to VPLEX indicates on what directors a virtual volume should ideally survive. The migrating of VMs to the site with access to its array improves I/O performance.

In embodiments like that discussed above, VPLEX Geo, in combination with vSphere, may proactively migrate VMs to ensure that one additional failure (or a limited number of additional failures) will not cause a DU event. Of course if the additional failure happens before the VMs are all moved the DU event can still be encountered. Once vSphere has a vulnerability where one additional failure (or a limited number of additional failures) results in lack of resources to run all VMs in one site or to move all VMs to one site, it should notify VPLEX about the situation. This may result in overruling the customer's indicated preferred site. Depending on the nature of the resource problem a should or must preference is given. Ideally, a should preference may be used when all VMs can run on one site but some resources become overcommitted based on limits in vSphere's resource allocations. A must preference may be used when VMs can no longer run on one site because of reservations specified in vSphere's resource allocation. A must preference may also be used when the vSphere inter-cluster link becomes vulnerable.

In another embodiment, when both clusters contain dirty cache data, the director clusters 220a,b may discard some of the last writes in order for the customer to carry on operations. As further discussed elsewhere herein, the director clusters 220a,b may rollback the volume image to a write order consistent image, which means that an image from some prior point in time will be restored.

According to various embodiments of the system described herein, it may be advantageous to avoid occurrences of VM image rollback, particular in connection with addressing a situation where a last independent inter-cluster link fails during or shortly after a VM migration and causes not all data to be available on the cluster that is the target of the VM migration. In an embodiment, the system described herein may provide for avoiding rollback of the distributed volume by writing to the distributed volume from only one cluster. By making sure that all the VMs that are accessing a certain file system, such as VMFS for vSphere and/or NTFS for Hyper-V, on a distributed volume are in the cluster of the preferred site, it may not be necessary to rollback an image when a link failure occurs. This does mean that the system is used in an active/passive fashion on a cluster level. All VMs accessing the same distributed volume may have to be migrated together by suspending all the VMs on the source ESX host cluster, synchronizing the dirty blocks from the source director cluster to the destination director cluster, moving the cluster preference to the destination cluster, and resuming all the VMs on the destination ESX host cluster. Therefore, in accordance with the system described herein may provide for synchronizing data between a source and destination site during a migration operation by moving dirty data from a source site to a destination site along with a VM that was running at the source site and then resuming the operation of the VM on the destination site.

FIG. 7 is a flow diagram 300 showing a method for providing mobility of a VM between a source site, such as site A 201, and a destination site, such as site B 202, of an active/active system according to an embodiment of the system described herein. At a step 302, for a VM operating on the source site, a determination is performed to identify the destination site that may be, for example, a preferred site and/or a winner site. Determining the destination site may occur in response to a determination that at least one additional failure will result in a lack of resources to maintain desired operation of the VM on the source site. After the step 302, processing proceeds to a step 304 where, while the VM is operating on the source site, an amount of storage data is transferred from the source site to the destination site. After the step 304, processing proceeds to a step 306 where at least a portion of the VM image is transferred to the destination site. In various embodiments, the steps 304 and 306 may be performed in a different order than shown and/or may be performed concurrently.

After the step 306, processing may proceed to a test step 308 where it is determined if a link failure has occurred between the source site and the destination site. As further discussed elsewhere herein, failure conditions may be determined using a witness node, for example. If it is determined at the test step 308 that a link failure has occurred, then processing proceeds to a step 330 where the transfer processing to the destination site is stopped and the VM is to be kept at the source site. After the step 330, processing is complete.

If it is determined that a link failure has not occurred at the test step 308, then processing proceeds to another test step 310 where it is determined whether a sufficient amount of storage data and/or memory (e.g., configuration state data) of the VM (VM image) has been transferred to the destination site. In various embodiments, a sufficient amount of storage data and/or VM image information may be determined according to one or more thresholds. For example, a threshold may be whether 90% of the storage data and/or the VM image has been transferred. In this way, since the VM continues to operate on the source site during this part of the process, changes to storage data and/or the VM image while the VM is operating in the source site may affect the determinations of the amount of current storage data and/or the VM image that has been transferred. The threshold may be configured to establish that at a particular point in time, given the amount of storage data and VM image information transferred, it is appropriate to proceed with processing to suspend and resume the VM on the destination site, as further discussed herein.

Accordingly, if, at the test step 310, it is determined that sufficient amounts of the storage data and/or VM image have not been transferred, then processing proceeds back to the step 304. Otherwise, if it is determined that a sufficient amount has been transferred at the test step 310 according to the threshold(s), then processing proceeds to a step 312 where operation of the VM is suspended on the source site. After the step 312, processing proceeds to a step 314 where a remainder amount of the storage data, that is remaining on the source site and that had not been transferred in the prior steps, is transferred from the source site to the destination site. After the step 314, processing proceeds to a step 316 where an a remainder amount of the VM image information, that is remaining on the source site and that had not been transferred in the prior steps, is transferred from the source site to the destination site. Like that of steps 304 and 306, in various embodiments, the steps 314 and 316 may be performed in an order other than that shown and/or may be performed concurrently.

After the step 316, processing proceeds to a step 318 where it is again determined if a link failure has occurred between the source site and the destination site. If it is determined at the test step 318 that a link failure has occurred, then processing proceeds to the step 330 where the transfer processing to the destination site is stopped and the VM is to be kept at the source site. After the step 330, processing is complete.

If it is determined that a link failure has not occurred at the test step 318, then processing proceeds to another test step 320 where transfer of the storage data and VM image to the destination site is completed. That is, for example, completion of data and VM image transfer may be when 100% of the storage data and VM image have been transferred. If not, then processing proceeds back to the step 314. If the transfer to the destination site is determined to be completed at the test step 320, then processing proceeds to a step 322 where the VM is resumed on the destination site according to the transferred storage data and the transferred VM image. After the step 322, processing is complete.

In various embodiments, the above-noted processing may also include provisions for error processing in which it is determined that processing, such as transferring of storage data and/or the VM image, may not be performed and/or may not be desirable to perform. For example, a system may include mechanisms for factoring in load determination processing such that a determination that load on a network is high may cause cancelation of the VM transfer even where a link failure has not occurred. Similarly, the error processing may be performed in connection with exceeding a time threshold where an attempt to transfer storage data and/or the VM image has timed out over a network. It is also noted that the above-described method, and other methods discussed herein, may be performed using executable code stored on a non-transitory computer readable medium that is executed by one or more processors and is performed in connection with a system having components like that further discussed elsewhere herein.

Another alternative embodiment of the system described herein is to make ESX hosts aware of the changed volume state by rebooting them so they pick up the current state. This assumes that ESX hosts do not forward information about their state to vCenter or other ESX hosts. All ESX hosts that may have state about volumes that have rolled back can be put in maintenance mode. The ESX host may not have to access the volume to store its updated state, because such access would risk corrupting the VMFS. By parking an ESX host in maintenance mode, all VMs that are not talking to the rolled back storage may be migrated to other ESX hosts. Once no VMs are remaining on the ESX host, it can be rebooted and pick up the new, rolled back state of the volume.

According to another embodiment of the system described herein, the system may control rollback of a volume, or portion thereof, in a different way. For example, the system may only rollback the state of the volume to a write order consistent image on the remote cluster. For example, a winning site may contain all local writes and only the remote writes that have been synchronized locally in a write order consistent way. This would result in a volume image that is not globally consistent, and it is noted that some applications may not be able to deal with this alternate rollback state.

According to another embodiment, the system described herein may provide for the use of the inter-cluster links between the host clusters (host networks 205) and the inter-cluster link between the director clusters (director networks 225) of multiple sites to be used to help migrate a VM. Such operation may be used to increase bandwidth of the host cluster enough that it is able to migrate over longer distances. Accordingly, instead, or in addition to, the transferring of a VM image using the host networks 205 and the storage data using the director networks 225, the host networks 205 may be used to transfer storage data and/or the director networks 225 may be used to transfer VM images. For example, in an embodiment, either the VM image and/or the storage data may be transferred over the director networks 225 between the director clusters in connection with a VM migration operation. In another embodiment, either the VM image and/or the storage data may be transferred over the host networks 205. It is further noted that in connection with this operation, a host cluster may perform writes of the VM's image to the source director cluster at the source site and corresponding reads to the destination director cluster at the destination site. The above-noted method may be performed in connection with a determination of a failure of an inter-cluster link, with at least a last remaining inter-cluster link in operation. That is, even though one inter-cluster link has failed, such as failure of host networks 205, migration of a VM may be advantageously enhanced by using the remaining inter-cluster link, such as director networks 225, to help with the migrating by increasing the bandwidth of the host cluster, and vice versa.

Figure 8A:
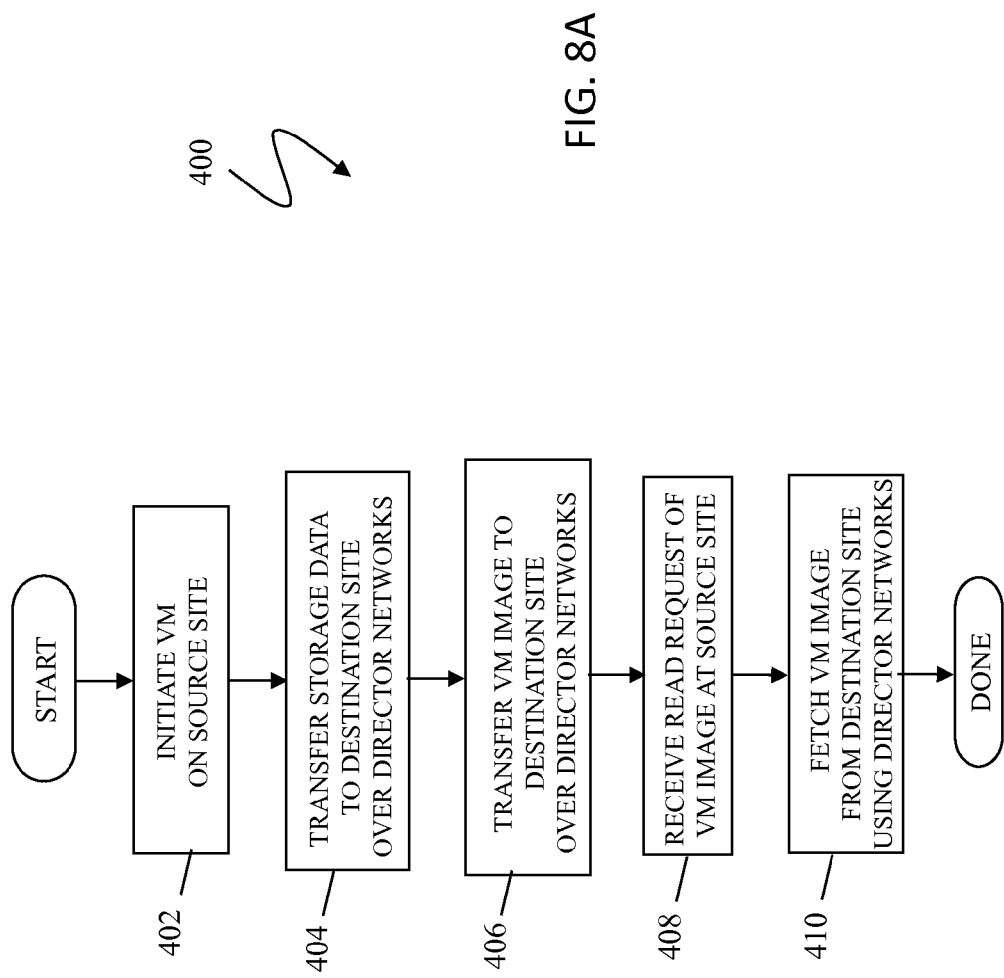
FIG. 8A is a flow diagram showing a method for using the inter-cluster link (director networks) between director clusters of multiple sites in an active/active system according to an embodiment of the system described herein.

FIG. 8A is a flow diagram 400 showing a method for using the inter-cluster link (director networks 225) between director clusters 220a,b of multiple sites 201, 202 in an active/active system according to an embodiment of the system described herein. At a step 402, operation of a VM is initiated, or otherwise maintained, on a source site (e.g., site A 201). After the step 402, processing proceeds to a step 404 where at least some storage data is transferred to the destination site (e.g., site B 202) over the director networks 225. After the step 404, processing proceeds to a step 406 where at least a portion of a VM image is transferred to the destination site over the director networks 225. In this embodiment, the portion of the VM image may be transferred over the director networks to a shared memory (e.g. cache) location on the destination site. After the step 406, processing proceeds to a step 408 where a read of the VM image, that was transferred to the destination site, is received at the host cluster of the source site. After the step 408, processing proceeds to a step 410 where a director of the source site fetches the VM image from the shared memory location on the destination site over the director networks 225 to service the read request. Accordingly, in this embodiment the VM image and storage data may be transferred from a source site to a destination site using the director networks 225. It is further noted that the order of various steps described above may be different than that shown and/or may be performed concurrently. After the step 410, processing is complete.

Figure 8B:
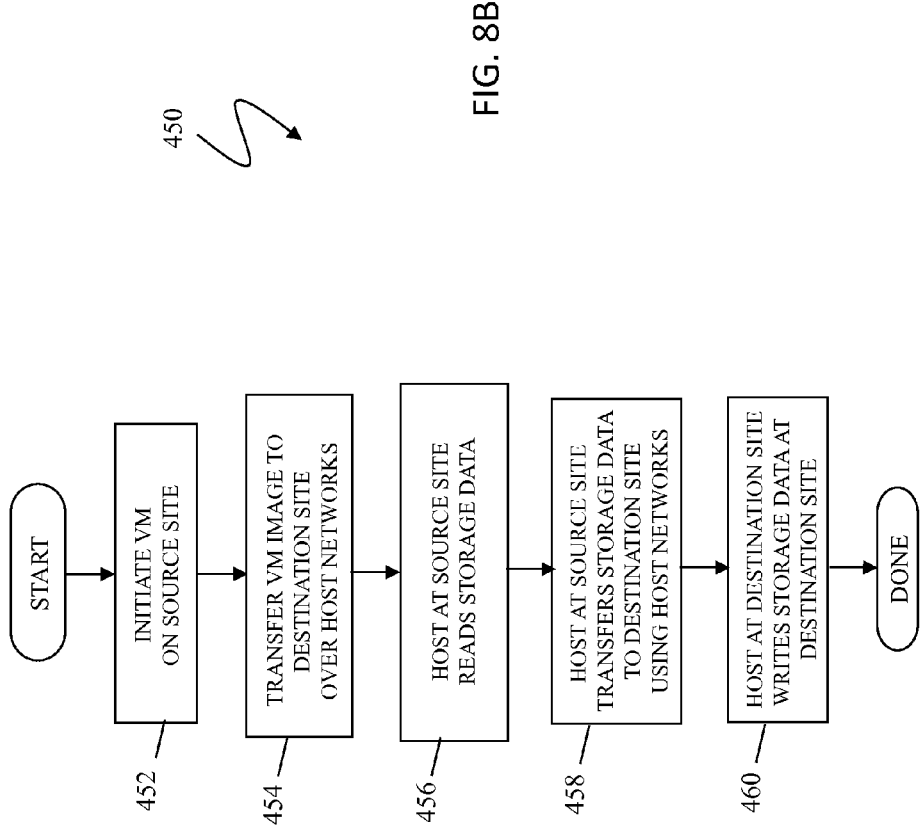
FIG. 8B is a flow diagram showing a method for using the inter-cluster link (host networks) between host clusters of multiple sites in an active/active system according to an embodiment of the system described herein.

FIG. 8B is a flow diagram 450 showing a method for using the inter-cluster link (host networks 205) between host clusters 210a,b of multiple sites 201, 202 in an active/active system according to an embodiment of the system described herein. At a step 452, operation of a VM is initiated, or otherwise maintained, on a source site (e.g., site A 201). After the step 452, processing proceeds to a step 454 where at least a portion of the VM image is transferred to the destination site (e.g., site B 202) over the host networks 205. After the step 454, processing proceeds to a step 456 where at least some storage data (dirty data) is read by a host at the source site (e.g., site A 201). After the step 456, processing proceeds to a step 458 where the host at the source site sends the storage data to the destination site over the host networks 205. After the step 458, processing proceeds to a step 460 where a host at the destination site writes the storage data to the destination site. Accordingly, in this embodiment the VM image and storage data may be transferred from a source site to a destination site using the host networks 205. It is further noted that the order of various steps described above may be different than that shown and/or may be performed concurrently. After the step 460, processing is complete.

In various embodiments, the processing of FIGS. 8A and 8B may be performed in various combinations with each other. That is, the VM image and storage data may be transferred from a source site to a destination site using the host networks 205 and the director networks 225 in any appropriate combination. For example, embodiments of the system described herein may be performed in combination with normal operations using the host networks 205 and the director networks 225, that is, in which storage data is transferred over the director networks 225 and/or a VM image is transferred over the host networks 205, along with the use of the director networks 225 to transfer VM images and the use of the host networks 205 to transfer storage data.

When the inter-cluster storage network fails, the symmetric view of the data blocks may no longer be maintained over the inter-cluster storage network. Generally, the storage application stops exporting a disk image on one site. At this point, the inter-cluster computer network may still be available and may be utilized to synchronize the storage to the winning site in accordance with the system described herein. This may be done in two ways: (1) pushing disk block ownership and data from losing site to winning site and/or (2) pulling disk block ownership and data from losing site to winning site.

Figure 9:
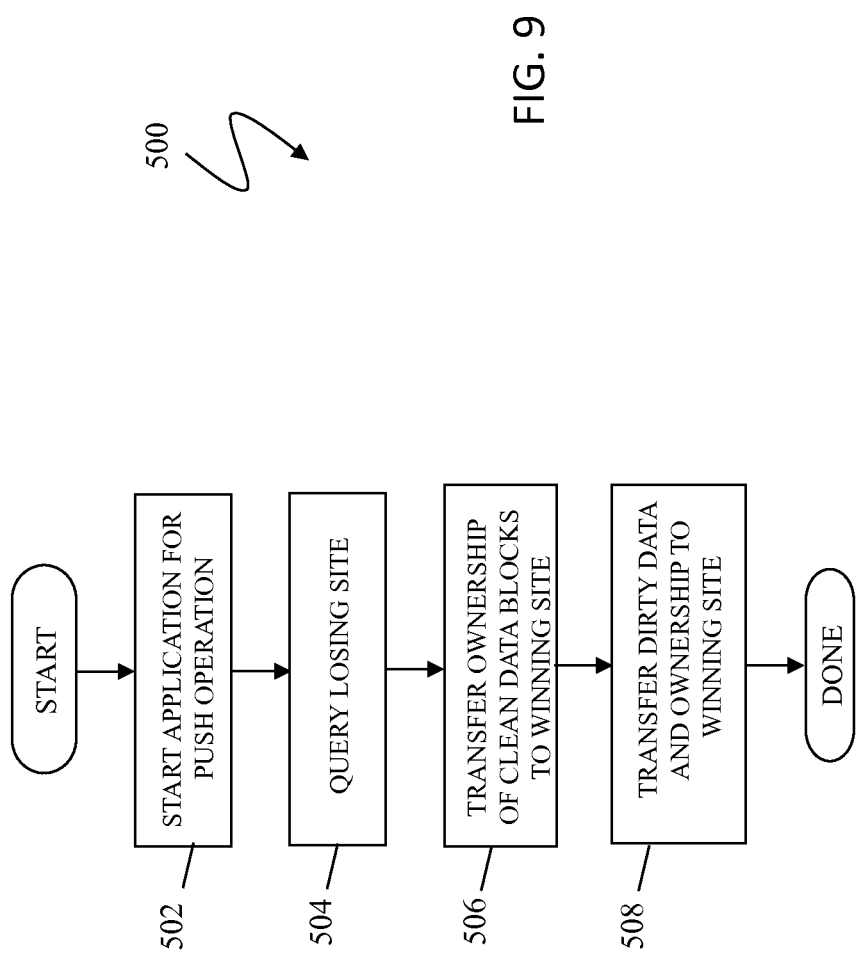
FIG. 9 is a flow diagram showing a method of pushing data block ownership and data from a losing site to a winning site in the event of a director network failure according to an embodiment of the system described herein.

FIG. 9 is a flow diagram 500 showing a method of pushing data block ownership and data from losing site to winning site in the event of a director network failure according to an embodiment of the system described herein, and in which alternate networks, such as the host networks, may be used. At a step 502, an application is started on one of the computers to transfer ownership of data blocks to the winning site. After the step 502, processing proceeds to a step 504 where the application queries the losing site for ownership of clean and dirty data blocks. After the step 504, processing proceeds to a step 506 where the ownership of the clean data blocks is transferred to the winning site from the losing site. After the step 506, processing proceeds to a step 508 where the dirty data blocks and the ownership of those blocks is transferred from the losing site to the winning site. In an embodiment, the ownership of dirty data blocks may only be transferred to the winning site after the dirty blocks are synchronized to the winning site, thereby allowing the winning site director cluster to serve incoming I/Os for those blocks. It is noted that the above-noted processing may be done in-band and out-of-band. After the step 508, processing is complete.

Figure 10:
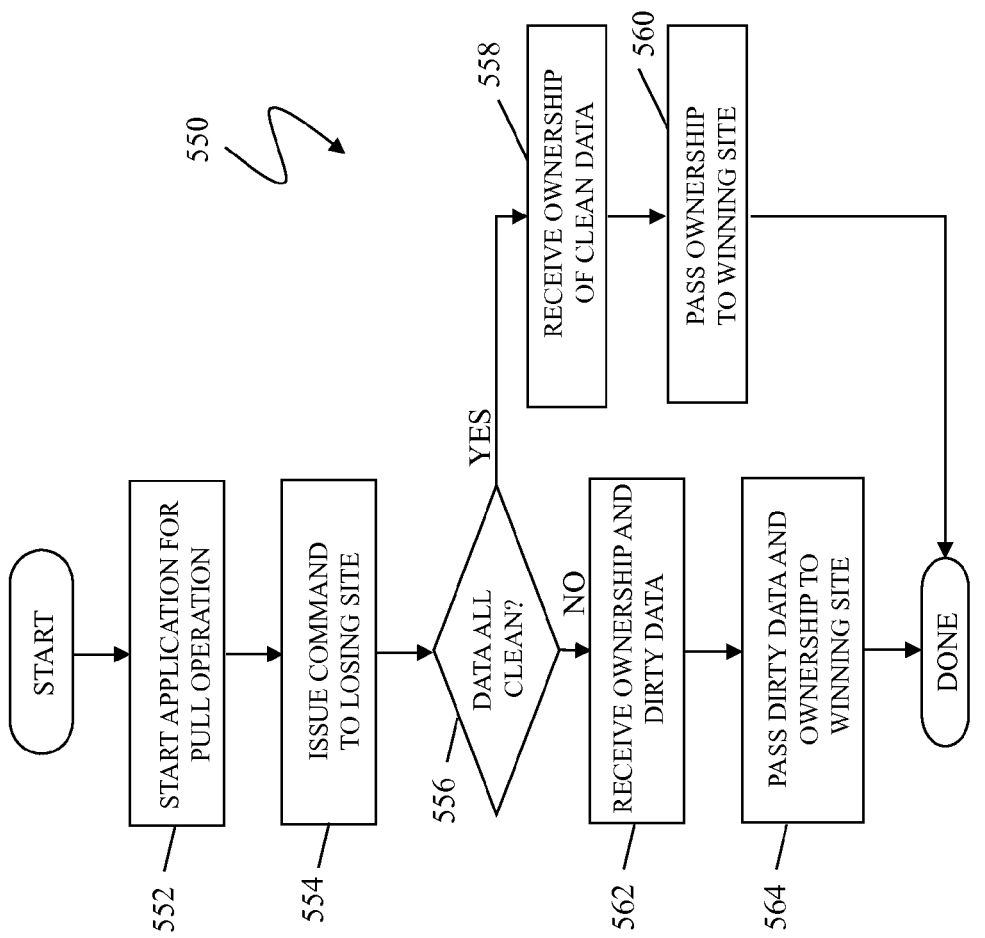
FIG. 10 is a flow diagram showing a method of pulling data block ownership and data from a losing site to a winning site according to an embodiment of the system described herein.

FIG. 10 is a flow diagram 550 showing a method of pulling data block ownership and data from the losing site to the winning site according to an embodiment of the system described herein. Reads and writes to the winning site may pull ownership and dirty data blocks from the losing site on an as-needed basis. At a step 552, an application is started on one of the computers to transfer ownership and dirty data blocks to the winning site when needed. At a step 554, the application issues a command to the losing site that requests ownership of data blocks and dirty data that are the subject of the command. In an embodiment, the command may be issued in connection with transmission of an error code. After the step 554, processing proceeds to a test step 556 where it is determined whether the requested data blocks are all clean data. If all the requested blocks are all clean data blocks, then processing proceeds to a step 558 where the application only receives the ownership of the data blocks. After the step 558, processing proceeds to a step 560 where the application passes the ownership of the data blocks to the winning site. The winning site can provide the clean data blocks after receiving the ownership. After the step 560, processing is complete. If, at the test step 556, it is determined that at least some of the requested blocks are dirty, then processing proceeds to a step 562 where the application receives the dirty blocks and the ownership. After the step 562, processing proceeds to a step 564 where the dirty blocks and the ownership are passed to the winning site. After the winning site receives the ownership, it can start serving I/Os for these blocks and no longer needs to pass an error code back. After the step 564, processing is complete.

A combination of the methods of pushing and pulling disk storage data and ownership is also possible according to various embodiments of the system described herein. For example, the combination of pushing the storage block ownership of clean blocks and pulling the block ownership and data of dirty blocks may be desirable.

According further to the system described herein, when the last redundant resource of a cluster level vulnerability fails, one of the clusters will no longer serve I/O, either because the cluster failed or because cache coherence can no longer be guaranteed between the clusters. If all VMs are appropriately moved to the less vulnerable or preferred site that is still serving I/O as set forth herein, then the system may continue operating in the manner provided. If not, however, three further options may be provided according to various embodiments of the system described herein: (1) All VMs may be restarted from a Write Order Fidelity (WOF) consistent virtual volume (e.g., from a couple of seconds ago). Due to the restart, the VMs may boot with an empty memory state; (2) All VMs may be restarted with an application consistent snapshot of the virtual volume. Periodic snapshot of the virtual volume may be created to facilitate this approach; and (3) All VMs may be resumed with a memory state and virtual volume state from a coordinated VM/disk snapshot. Periodic coordinated snapshots of both VM (with memory state) and virtual volume may be created to facilitate the approach of case 3.

In case 1, all applications running in VMs should be able to detect what work is lost by studying the current state of the disk and carry on from that point. In case 2, all applications running in VMs may simply carry on without having to check the state of the disk. In cases 2 and 3, all applications running in VMs may redo the work from the moment that the snapshots were taken. Note that external transactions to the VMs that occurred since the snapshot may be lost. Write order consistency may be achieved by grouping writes in "deltas" and providing consistency on a delta boundary basis. Deltas may have ids that are monotonically increasing, where older deltas have lower numbers. A WOF pipeline may include multiple deltas. Further details of WOF and WOF pipelines may be found in U.S. Pat. No. 7,475,207 to Bromling et al. and U.S. patent application Ser. No. 13/136,359 to Van Der Goot, which are referenced elsewhere herein.

Figure 11:
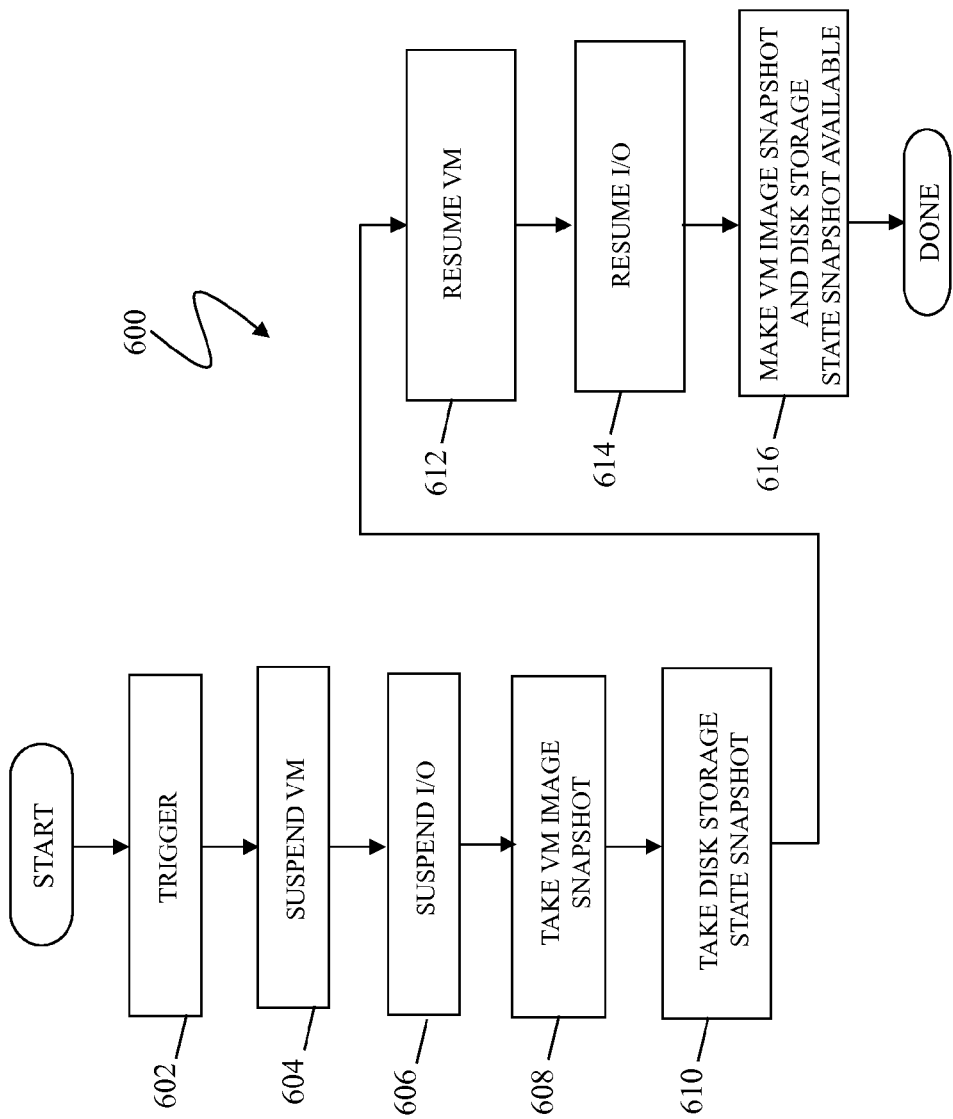
FIG. 11 is a flow diagram showing a method for taking and using synchronized snapshots of the memory state (image) of a VM and the storage state of a disk to provide a fail-over mechanism for high availability.

FIG. 11 is a flow diagram 600 showing a method for taking and using synchronized snapshots of the memory state (image) of a VM and the storage state of a disk to provide a fail-over mechanism for high availability. At a step 602, a determination is made to trigger a check point in which a synchronized VM image snapshot and storage state snapshot of a disk are obtained. For example, in an embodiment, triggering a check point may occur following a failure condition in which one additional failure may result in insufficient resources for operation of the VM on an active/active system, as further discussed elsewhere herein. The failure may include a link failure and/or a failure of a site. In another embodiment, a user may trigger a check point. In still other embodiments, check points may be triggered by a SCSI command, a user command, and/or an I/O operation.

After the step 602, processing proceeds to a step 604 where the VM is suspended such that a snapshot image of the VM may be obtained. After the step 604, processing proceeds to a step 606 where I/O processing is suspended such that a storage state snapshot may be obtained. Various techniques may be used in connection with suspending I/O processing. It is noted that steps 604 and 606 may be reversed, as appropriate, and performed in parallel.

After the step 606, processing proceeds to a step 608 where a snapshot image of the VM is taken when the VM is preparing to commit a write of a delta to a group (or bucket) in accordance with WOF pipeline processing as further discussed elsewhere herein. After the step 608, processing proceeds to a step 610 where a snapshot is taken of the storage state of a disk being utilized to store data in connection with the WOF transfer processing. The VM image snapshot and the storage state snapshots are synchronized and it is noted that the order of steps 608 and 610 may be reversed, as appropriate, and/or may be performed in parallel. After the step 610, processing proceeds to a step 612 where the VM is resumed. After the step 612, processing proceeds to a step 614 where I/O processing is resumed. It is noted that the steps 612 and 614 may be reversed, as appropriate, or performed in parallel. After the step 614, processing proceeds to a step 616 where the VM image snapshot and storage state snapshot are made available for subsequent access as further discussed elsewhere herein. After the step 616, processing is complete.

The system described herein may provide for advantageous sharing and mobility of resources using a virtual platform product that federates and/or coordinates virtual storage, such as EMC's VPLEX product. In various embodiments, the resources may be resources provided by virtual data centers and/or Vblocks, as further discussed elsewhere herein, and including storage volumes with files and/or object data structures. The system described herein may enable migration resources dynamically and non-disruptively, thereby allowing a user to move storage data and/or compute processing. For example, the system described herein may enable migration of the contents of one Vblock to another Vblock and/or may enable migration of contents of a virtual data center to another virtual data center that may be contained in the same or different Vblocks and may provide for seamless migration within a data center and/or among multiple data centers. By enabling use of dynamic policies, the system described herein allows for dynamically load balanced among virtual platforms and infrastructure products.

According to an embodiment of the system described herein, distributed resources may be shared between multi-connected virtual platform clusters, such as VPLEX clusters, in a dynamic sharing arrangement. A virtual platform cluster (e.g., VPLEX cluster) may include one or more pairs of directors that enables failover from one director of the pair(s) to the other director of the pair(s) in a cluster in the case of hardware or path failure. In an exclusive sharing arrangement between two VPLEX clusters, the distributed shares are shared in an all-or-nothing arrangement in which either all or none of the distributed resources are shared between the two VPLEX clusters. In an embodiment, the system described herein advantageously enables a dynamic sharing relationship between multiple virtual platform clusters that may be tied to specific resources.

Figure 12:
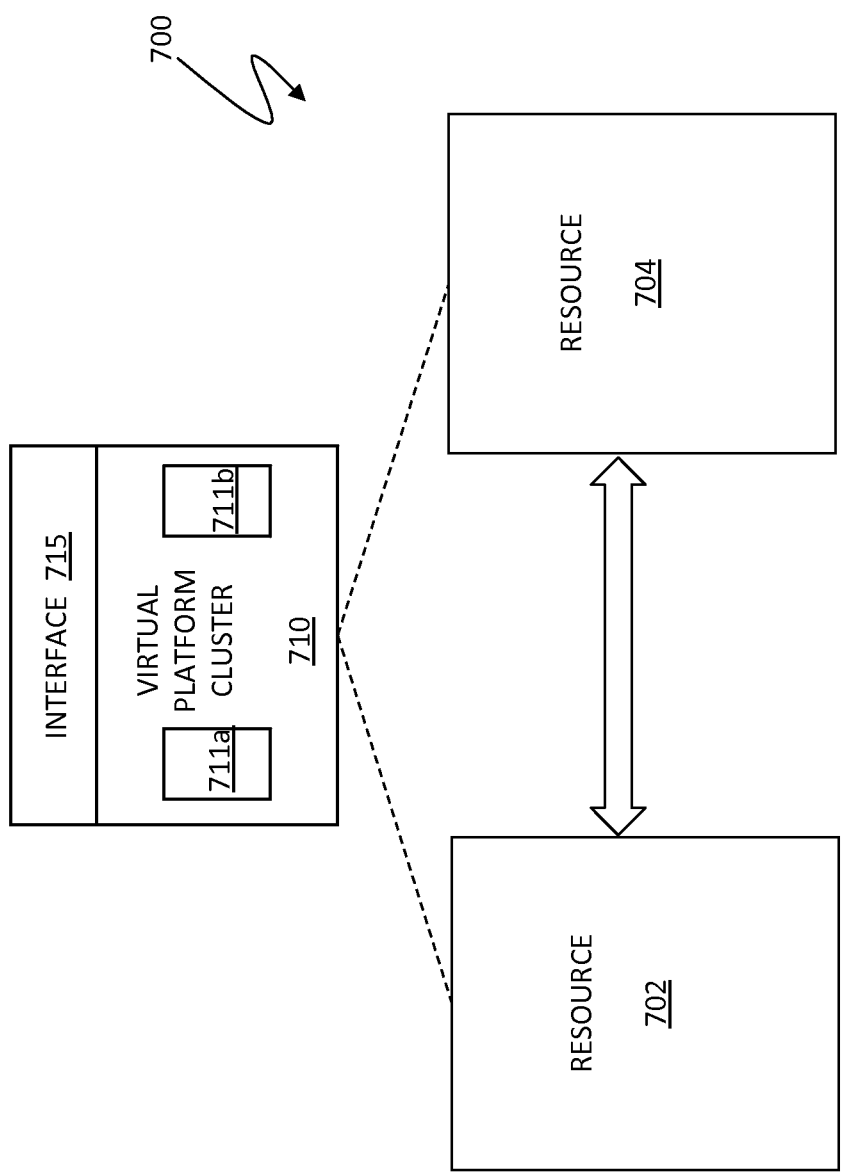
FIG. 12 is a schematic illustration of showing a distributed processing system with a virtual platform cluster controlling access to separate resources that may be, for example, resources provided by Vblocks and/or other appropriate converged infrastructure product that may be used according to an embodiment of the system described herein.

FIG. 12 is a schematic illustration of showing a distributed processing system 700 with a virtual platform cluster 710 controlling access to separate resources 702, 704 that may be, for example, resources provided by Vblocks and/or other appropriate converged infrastructure product that may be used according to an embodiment of the system described herein. Although two resources 702, 704 are shown, the system described herein may be used in connection with any number of resources to satisfy desired configuration requirements (e.g., resources of different Vblock package types 0, 1 and 2). In various embodiments, the resources 702, 704 may be separated by a latency that allows for synchronous or asynchronous transference of data therebetween. In various embodiments, the resources 702, 704 may also include separate Vblocks in the same or different data centers and/or may include different virtual data centers within the same Vblock.

The virtual platform cluster 710 may include one or more pairs of directors 711a, 711b that, as noted above, enables failover from one director of the pair(s) to the other director of the pair(s) in a cluster in the case of hardware or path failure. In an embodiment, the virtual platform cluster 710 may include a VPLEX cluster component (e.g., VPLEX Metro for synchronous latencies and/or VPLEX Geo for asynchronous latencies) that may be used to provide high availability support for the host clusters, including ESX HA cluster support (see, e.g., FIGS. 3-5), for the pairing of the resources (Vblocks) 702, 704 for operations, for active/active storage operations and/or site failure handling for disaster recovery operations. The illustrated embodiment may be used to advantageously reduce durations for a recovery point objective (RPO) and a recovery time objectives (RTO) in connection with recovery operations using multiple Vblocks. It is further noted that although the virtual platform cluster 710 is shown as a separate component, the virtual platform component 710 may be implemented as a software layer distributed across one or more infrastructures (e.g., Vblocks) providing the resources 702, 704. In the virtualization environment of the system 700, the virtual platform cluster 710 may function to provide for control of managing, monitoring, provisioning and migrating virtual machines among Vblocks of one or more data centers.

An interface 715 may be provided to enable orchestration of the resource access and/or other control functions among the resources 702, 704, including migration of virtual data centers (VDCs). In an embodiment, the interface 715 may be provided by a common management layer, such as a management layer 258 (see FIG. 6), used to manage the converged infrastructure product. A specific instantiation of the interface 715 for the Vblock platform may be provided using EMC's UIM product, as discussed elsewhere herein. The interface 715 may provide policy driven orchestration for controlling access and/or operations in connection with VDC migration. The interface 715 may be used in connection with controlling and implement policies and/or other information for migration operations and/or servicing of I/O requests. The interface 715 may be used to orchestrate the resource sharing based on policies and/or other information fed from manual and dynamic inputs, where compute and storage processes may reside, and provides non-disruptive control and/or dynamic load balancing among the resources 702, 704.

In various embodiments, migration and/or access of objects among the resources 702, 704 may be performed in connection with storage tiering between Vblocks. For example, resource 702 may include storage arrays of a first type and resource 704 may include storage arrays of a second type, in which the first and second types of storage arrays having different characteristics. For example, the first type may be of a type that has fast accessibility (or more expensive) whereas the second type of storage may be of a slower (or less expensive) accessibility type. For a discussion of tiered storage systems and techniques, reference is made to U.S. Pat. No. 7,949,637 to Burke, entitled "Storage Management for Fine Grained Tiered Storage with Thin Provisioning," which is incorporated herein by reference.

Figure 13:
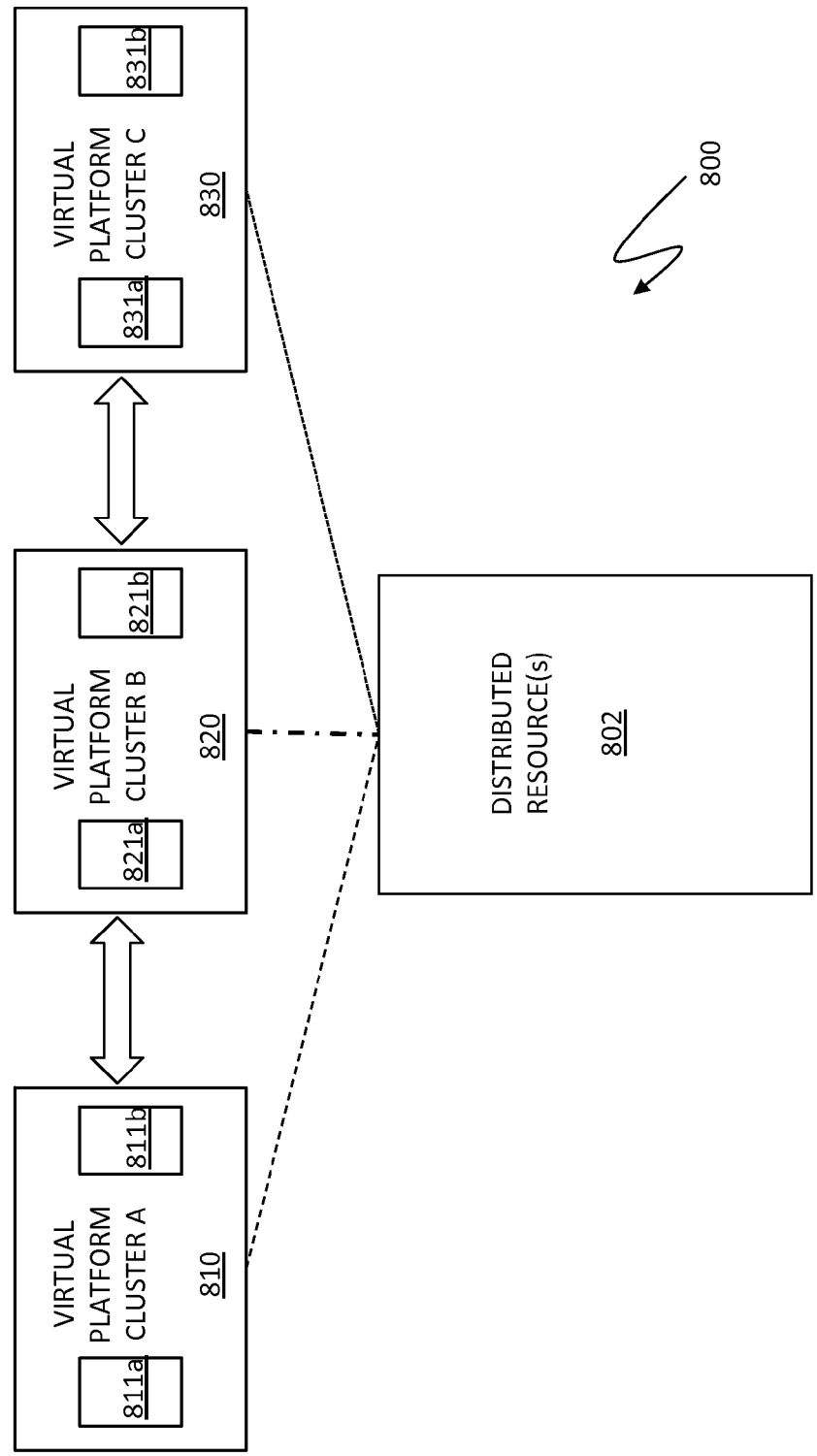
FIG. 13 is a schematic illustration showing a distributed processing system having multiple virtual platform clusters A, B, C according to an embodiment of the system described herein.

FIG. 13 is a schematic illustration showing a distributed processing system 800 having multiple virtual platform clusters A, B, C 810, 820, 830 according to an embodiment of the system described herein. The virtual platform clusters A, B, C 810, 820, 830 may each be coupled to one or more distributed resources, like distributed resource 802 as illustrated. Each of the virtual platform clusters 810, 820, 830 may include pairs of directors 811a,b, 821a,b, 831a,b. In an embodiment, each of the virtual platform clusters A, B, C 810, 820, 830 may be a VPLEX cluster. The distributed resource 802 may include a converged infrastructure, such as a Vblock, that is accessible by each of the virtual platform clusters 810, 820, 830, as further discussed elsewhere herein. It is further noted that the virtual platform clusters A, B, C 810, 820, 830 may also be communicatively coupled, as shown. Each of the virtual platform clusters A, B, C 810, 820, 830 may include an interface like that shown in connection with the virtual platform cluster 710 of the distributed processing system 700.

Figure 14:
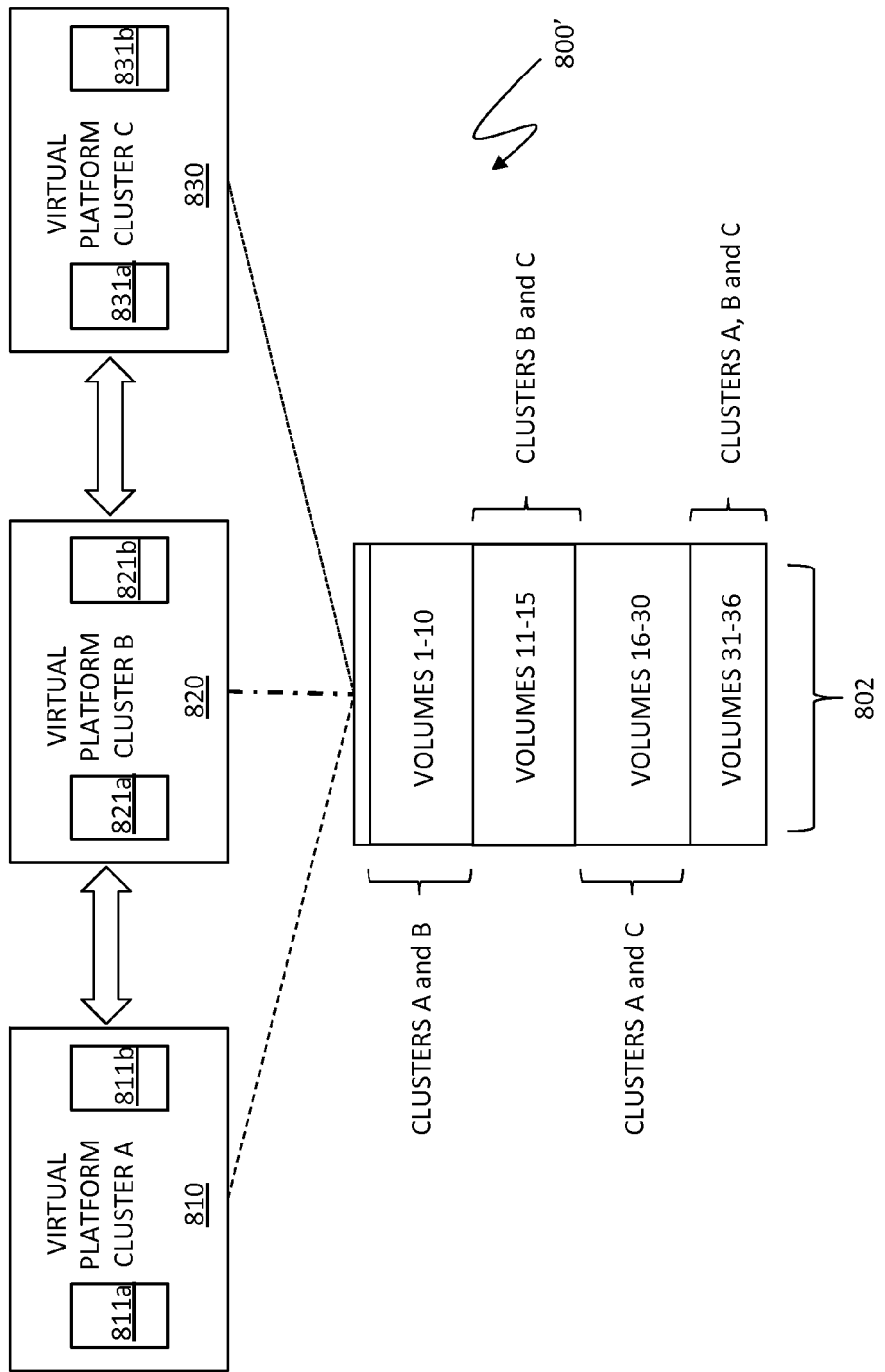
FIG. 14 is a schematic illustration showing a distributed processing system in which volumes of the distributed resource are shown as being shared among various sets of the distributed platform clusters A, B, C according to an embodiment of the system described herein.

FIG. 14 is a schematic illustration showing a distributed processing system 800', like the distributed processing 800, in which volumes of the distributed resource 802 are shown as being shared among various sets of the distributed platform clusters A, B, C 810, 820, 830 according to an embodiment of the system described herein. Although volumes are illustrated and principally discussed herein, it is noted that the system described herein may be used in connection with other objects including files, LUNs, VMs, VDCs, file systems (in appropriate situations) as well as any other appropriate object data structure in connection with a distributed resource. In the illustrated example, volumes 1-10 of the distributed resource 802 may be shared by the virtual platform clusters A and B. Volumes 11-15 may be shared by the virtual platform clusters B and C. Volumes 16-30 may be shared by the virtual platform clusters A and C. Volumes 31-36 may be shared by all the clusters A, B and C. According to the system described herein, the relationship between the volumes (or other objects) and the cluster set may be dynamically changed and be advantageously controlled temporally for the time of activity and use of the volumes and/or other resources being shared.

Figure 15:
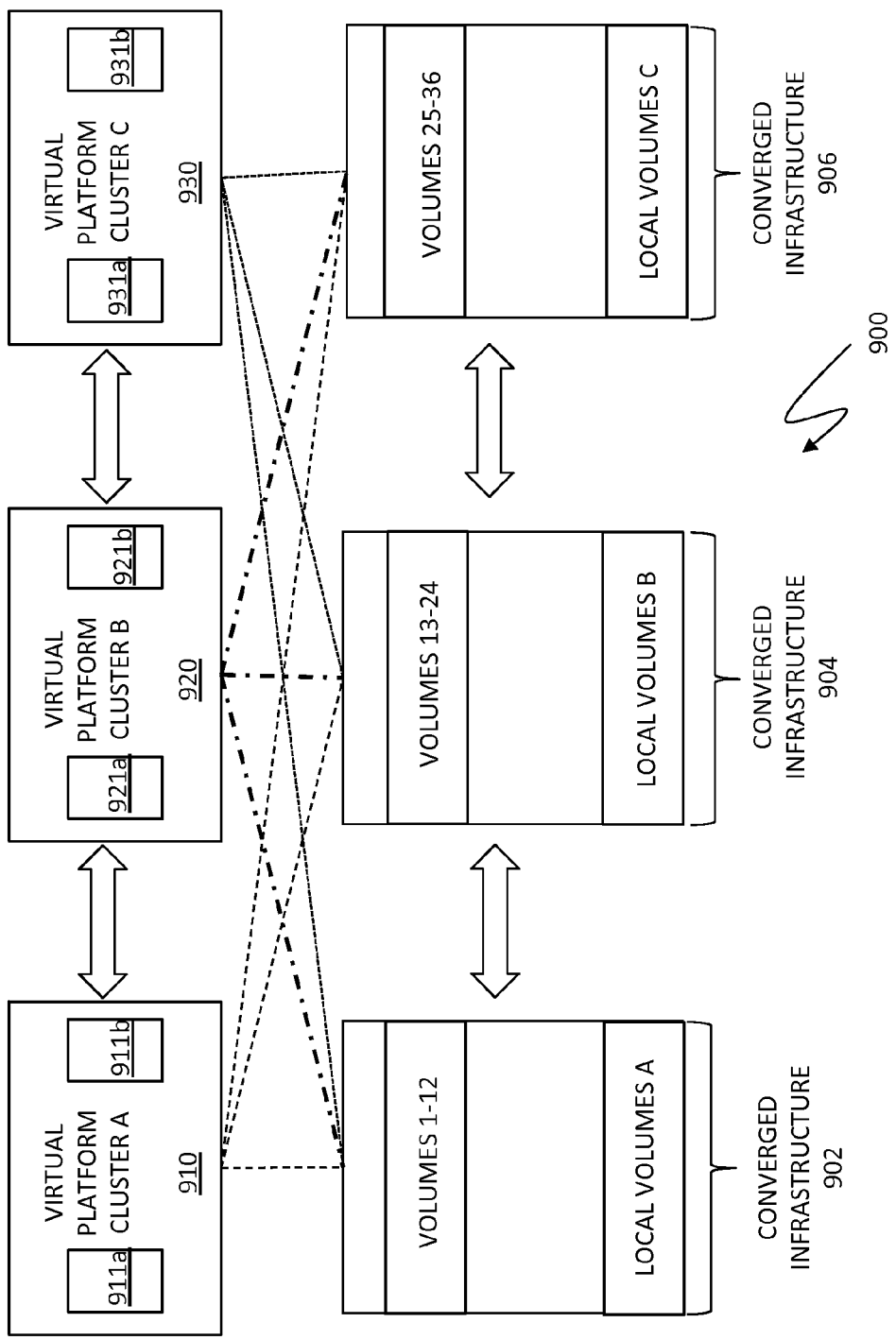
FIG. 15 is a schematic illustration showing a distributed processing system showing virtual platform clusters A, B, C, each including a pair of directors, and coupled to multiple converged infrastructures according to an embodiment of the system described herein.

FIG. 15 is a schematic illustration showing a distributed processing system 900 showing virtual platform clusters A, B, C 910, 920, 930, each including a pair of directors 911a,b, 921a,b, 931a,b, like that described in connection with the virtual platform clusters discussed elsewhere herein. The virtual platform clusters 910, 920, 930 may each be coupled to multiple converged infrastructures 902, 904, 906 that provide access to resources distributed among the converged infrastructures 902, 904, 906. In an embodiment, the converged infrastructures 902, 904, 906 may be Vblocks and the virtual platform clusters 910, 920, 930 may be VPLEX clusters. Each of the virtual platform clusters may correspond locally to one of the converged infrastructures 902, 904, 906 but may also be multi-connected to access the distributed resources of any of the converged infrastructures 902, 904, 906.

Resources of the converged infrastructures 902, 904, 906 are shown in connection with volumes 1-36, specifically in which volumes 1-12 are physically located on converged infrastructure 902, volumes 13-24 are physically located on converged infrastructure 904, and volumes 25-36 are physically located on converged infrastructure 906. However, the volumes 1-36 may be distributed resources of the distributed processing system 900 and thereby accessible by any of the virtual platform clusters 910, 920, 930. In an embodiment, the volumes 1-36 may be shared among the virtual platform clusters A, B, C 910, 920, 930 in a manner like that shown and described in connection with the distributed processing system 800', in which volumes 1-10 of the distributed resource 902 may be shared by the virtual platform clusters A and B; volumes 11-15 may be shared by the virtual platform clusters B and C; volumes 16-30 may be shared by the virtual platform clusters A and C; and volumes 31-36 may be shared by all the clusters A, B and C. According to the system described herein, the sharing arrangement of the volumes 1-36 may be dynamically changed over time based on the access requirements of each of the virtual platform clusters A, B, C.

In an embodiment, each of the virtual platform clusters 910, 920, 930 may also have their own local volumes available on the corresponding converged infrastructures 902, 904, 906 that are shown as local volumes A, B, C. In some embodiments, as desired for efficiency and/or error or failover processing, one or more of the volumes being shared as distributed resources may be copied and/or moved from a distributed resource of remote converged infrastructure to the local volume of the virtual platform cluster sharing the particular volumes. In this manner, according to the system described herein, multiple copies of certain of the volumes may be copied among the converged infrastructures according to the volume sharing processes discussed elsewhere herein to provide, for example, disaster recovery storage and processing capabilities in the event of error and/over failover occurrences without having to make copies of the entire contents of one or more converged infrastructures.

Figure 16:
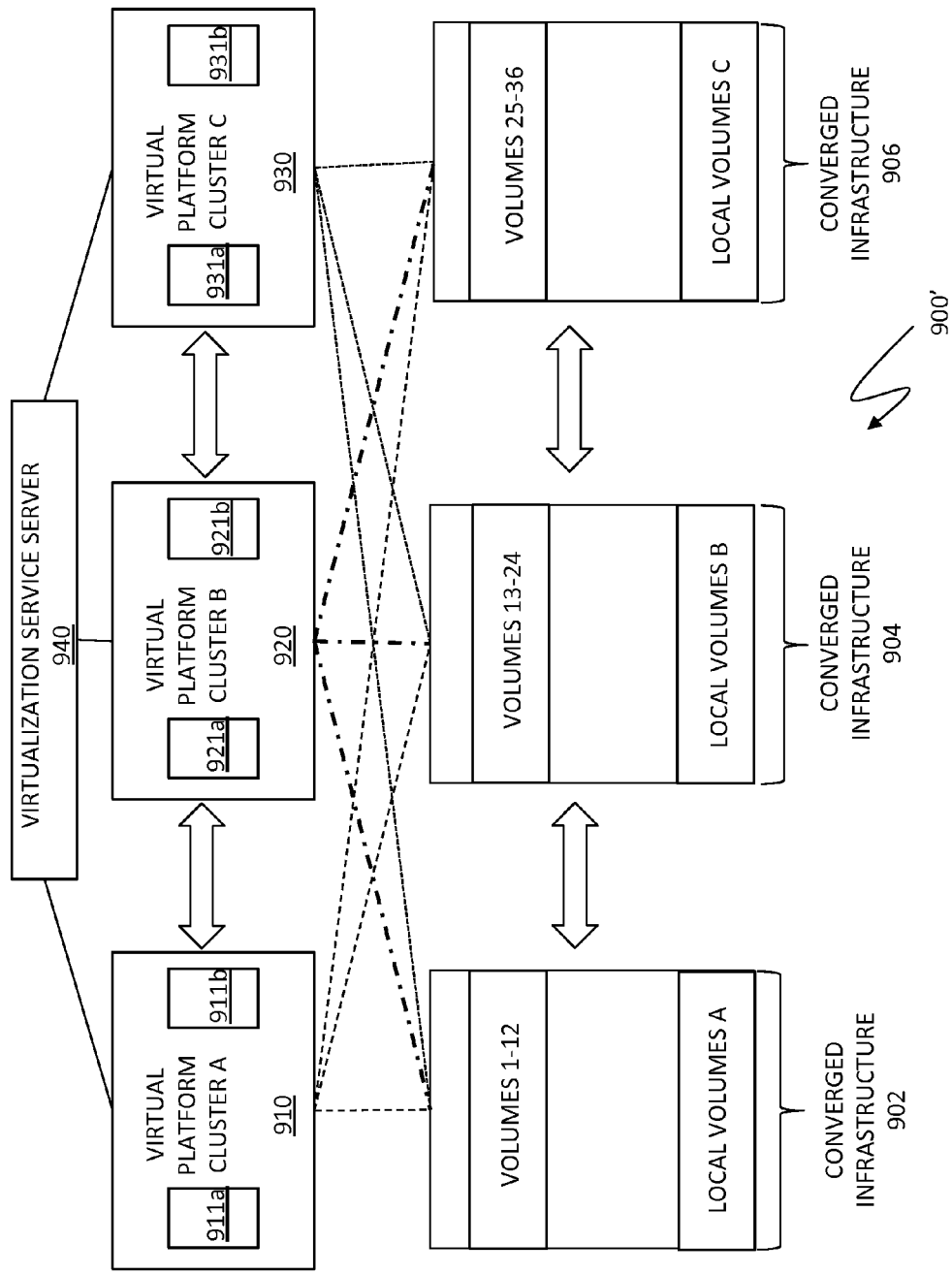
FIG. 16 is a schematic illustration showing a distributed processing system that further illustrates a virtualization service server according to an embodiment of the system described herein.

FIG. 16 is a schematic illustration showing a distributed processing system 900', like that distributed processing system 900, that further illustrates a virtualization service server 940. The virtualization service server 940 may be coupled to the virtual platform clusters 910, 920, 930. In various embodiments, the virtualization service server 940 may be a standalone server and/or may be distributed across the virtual platform clusters 910, 920, 930. The virtualization service server 940 may control the providing of services using the multi-connected virtual platform clusters 910, 920, 930 and the shared resources thereof in connection with the access and use of the resources distributed across one or more of the converged infrastructures 902, 904, 906, as further discussed in detail elsewhere herein.

According to the system described herein, for any of the distributed processing systems discussed herein, the distributed resources may be available from the plurality of virtual platform clusters in connection with operation under different latencies or operating conditions. In various embodiments, the different latencies or operating conditions may include synchronous or asynchronous latencies and active or passive operations. A composed relationship between subsets of resources shared among the plurality of virtual platform clusters may include multiple legs with all combinations of the different latencies or operating conditions, including synchronous latency/active operating condition, synchronous latency/passive operating condition, asynchronous latency/active operating condition and/or asynchronous latency/passive operating condition.

FIG. 17 is a flow diagram 1000 showing processing for sharing resource objects (e.g., volumes, LUNS, VMs, files etc.) among multiple virtual platform clusters (e.g. VPLEX clusters) for one or more converged infrastructure products (e.g., Vblocks) according to an embodiment of the system described herein. As discussed elsewhere herein, the processing described herein may be applied in connection with distributed resources of one or more converged infrastructures. At a step 1002, a first resource is identified as subject to sharing among the virtual platform clusters. The first resource may be include one or more objects stored on a converged infrastructure and may including volumes, LUNs, VMs, and/ or other storage, network and/or compute resources. After the step 1002, processing proceeds to a step 1004 where a first virtual platform cluster is identified that is sharing the first resource object. After the step 1004, processing progresses to a step 1006 where another virtual platform cluster is identified that is sharing the first resource. After the step 1006, processing proceeds to a test step 1008 where is it is determined if there any other virtual platform clusters that are sharing the first resource.

If, at the test step 1008, it is determined that there are additional virtual platform clusters, then processing proceeds back to the step 1006. Otherwise, processing proceeds to a step 1010 where a management component of one or more of the virtual platform clusters is used to orchestrate the sharing of the first resource among the virtual platform clusters. In an embodiment, the management component may include a virtualization server distributed across one or more of the virtual platform clusters and may include use of one or more interfaces. After the step 1010, processing proceeds to a step 1012 where sharing of the first resource is enabled among the relevant virtual platform clusters. The system described herein advantageously enables sharing of portions of the contents of converged infrastructures, rather than, necessarily, sharing of entire converged infrastructures. Accordingly, the system described herein provides for sharing among virtual platform clusters at an object level that enables object level disaster recovery and failover processing. After the step 1012, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of sharing resources in a virtualized environment, comprising:
   providing access by a plurality of virtual platform clusters to distributed resources of the virtualized environment, wherein each of the virtual platform clusters includes a director that manages resources therefor; and
   dynamically managing sharing of the distributed resources among the plurality of virtual platform clusters according to a sharing arrangement, wherein the distributed resources include a plurality of objects, and wherein a first subset of the plurality of objects is shared among a first plurality of virtual platform clusters differently than and a second subset of the plurality of objects, different from the first plurality of objects, is shared among a second plurality of virtual platform clusters, the first plurality of virtual platform clusters and the second plurality of virtual platform clusters including at least one virtual platform cluster in common and at least one other of the virtual platform clusters being in the first plurality of virtual platform clusters and not in the second plurality of virtual platform clusters.

2. The method according to claim 1, wherein the distributed resources are provided on a plurality of converged infrastructures that are remotely located from each other.

3. The method according to claim 1, wherein the distributed resources are available from the plurality of virtual platform clusters in connection with operation under different latencies or operating conditions, the different latencies or operating conditions including at least one of: a synchronous latency, an asynchronous latency, an active operating condition or a passive operating condition.

4. The method according to claim 3, wherein a composed relationship of at least one of the subsets of the plurality of objects shared among the plurality of virtual platform clusters includes multiple legs having combinations of the different latencies or operating conditions, the combinations including at least one of: synchronous latency/active operating condition, synchronous latency/passive operating condition, asynchronous latency/active operating condition, or asynchronous latency/passive operating condition.

5. The method according to claim 1, wherein the sharing arrangement is changed over time according to changing access requirements of the plurality of virtual platform clusters to the distributed resources.

6. The method according to claim 1, wherein each of the first subset and the second subset of objects shared among the plurality of virtual platform clusters include fewer than all of the plurality of objects.

7. The method according to claim 1, wherein the plurality of virtual platform clusters includes at least three virtual platform clusters.

8. The method according to claim 1, further comprising:
providing a management component distributed across the plurality of virtual platform clusters.

9. The method according to claim 1, wherein a virtual platform director manages resources for one or more virtual machines in the respective virtual platform cluster.

10. A non-transitory computer readable medium storing software for sharing resources in a virtualized environment, the software comprising:
executable code that provides access by a plurality of virtual platform clusters to distributed resources of the virtualized environment, wherein each of the virtual platform clusters includes a director that manages resources therefor; and
executable code that dynamically manages sharing of the distributed resources among the plurality of virtual platform clusters according to a sharing arrangement, wherein the distributed resources include a plurality of objects, and wherein a first subset of the plurality of objects is shared among a first plurality of virtual platform clusters and a second subset of the plurality of objects, different from the first plurality of objects, is shared among a second plurality of virtual platform clusters, the first plurality of virtual platform clusters and the second plurality of virtual platform clusters including at least one virtual platform cluster in common and at least one other of the virtual platform clusters being in the first plurality of virtual platform clusters and not in the second plurality of virtual platform clusters.

11. The non-transitory computer readable medium according to claim 10, wherein the distributed resources are provided on a plurality of converged infrastructures that are remotely located from each other.

12. The non-transitory computer readable medium according to claim 10, wherein the distributed resources are available from the plurality of virtual platform clusters in connection with operation under different latencies or operating conditions, the different latencies or operating conditions including at least one of: a synchronous latency, an asynchronous latency, an active operating condition or a passive operating condition.

13. The non-transitory computer readable medium according to claim 12, wherein a composed relationship of at least one of the subsets of the plurality of objects shared among the plurality of virtual platform clusters includes multiple legs having combinations of the different latencies or operating conditions, the combinations including at least one of: synchronous latency/active operating condition, synchronous latency/passive operating condition, asynchronous latency/active operating condition, or asynchronous latency/passive operating condition.

14. The non-transitory computer readable medium according to claim 10, wherein the sharing arrangement is changed over time according to changing access requirements of the plurality of virtual platform clusters to the distributed resources.

15. The non-transitory computer readable medium according to claim 10, wherein each of the first subset and the second subset of objects shared among the plurality of virtual platform clusters include fewer than all of the plurality of objects.

16. The non-transitory computer readable medium according to claim 10, wherein the plurality of virtual platform clusters includes at least three virtual platform clusters.

17. The non-transitory computer readable medium according to claim 10, further comprising:
executable code that provides a management component distributed across the plurality of virtual platform clusters.

18. The non-transitory computer readable medium according to claim 10, wherein a virtual platform director manages resources for one or more virtual machines in the respective virtual platform cluster.

19. A system of a virtualized environment, comprising:
a plurality of virtual platform clusters;
at least one converged infrastructure;
a non-transitory computer readable medium storing software for sharing resources in the virtualized environment, the software comprising:
executable code that provides access by the plurality of virtual platform clusters to distributed resources of the at least one converged infrastructure, wherein each of the virtual platform clusters includes a director that manages resources therefor; and
executable code that dynamically manages sharing of the distributed resources among the plurality of virtual platform clusters according to a sharing arrangement, wherein the distributed resources include a plurality of objects, and wherein a first subset of the plurality of objects is shared among a first plurality of virtual platform clusters and a second subset of the plurality of objects, different from the first plurality of objects, is shared among a second plurality of virtual platform clusters, the first plurality of virtual platform clusters and the second plurality of virtual platform clusters including at least one virtual platform cluster in common and at least one other of the virtual platform clusters being in the first plurality of virtual platform clusters and not in the second plurality of virtual platform clusters.

20. The system according to claim 19, wherein the distributed resources are provided on a plurality of converged infrastructures that are remotely located from each other, and wherein the sharing arrangement is changed over time according to changing access requirements of the plurality of virtual platform clusters to the distributed resources.

21. The system according to claim 19, wherein the distributed resources are available from the plurality of virtual platform clusters in connection with operation under different latencies or operating conditions, the different latencies or operating conditions including at least one of: a synchronous latency, an asynchronous latency, an active operating condition or a passive operating condition.

22. The system according to claim 21, wherein a composed relationship of at least one of the subsets of the plurality of objects shared among the plurality of virtual platform clusters includes multiple legs having combinations of the different latencies or operating conditions, the combinations including at least one of: synchronous latency/active operating condition, synchronous latency/passive operating condition, asynchronous latency/active operating condition, or asynchronous latency/passive operating condition.

23. The system according to claim 19, wherein a virtual platform director manages resources for one or more virtual machines in the respective virtual platform cluster.

\* \* \* \* \*